United States Patent [19]
Omori et al.

[11] Patent Number: 5,821,709
[45] Date of Patent: Oct. 13, 1998

[54] DC MOTOR CONTROL CIRCUIT

[75] Inventors: Koji Omori; Tomohiro Kataoka, both of Osaka; Kazunori Kajitani, Shimane, all of Japan

[73] Assignee: Omron Corporation, Kyoto, Japan

[21] Appl. No.: 795,936

[22] Filed: Feb. 5, 1997

Related U.S. Application Data

[63] Continuation of Ser. No. 475,357, Jun. 7, 1995, abandoned.

[51] Int. Cl.$^6$ ................................................. H02K 23/00
[52] U.S. Cl. ........................ 318/254; 318/138; 318/439; 318/782; 388/903
[58] Field of Search ..................... 318/138, 439, 318/254, 782, 798–815, 434, 757, 478, 479; 388/903, 840, 937, 442; 361/2, 18, 100

[56] References Cited

U.S. PATENT DOCUMENTS

| | | | |
|---|---|---|---|
| 3,715,642 | 2/1973 | Walter | 318/254 X |
| 4,468,597 | 8/1984 | Baumard et al. | 318/317 |
| 4,682,095 | 7/1987 | Shibata et al. | 318/798 X |
| 4,983,894 | 1/1991 | Oku et al. | 318/138 |
| 4,985,666 | 1/1991 | Nakabayashi | 318/434 |
| 4,995,094 | 2/1991 | Aio | 388/840 |
| 5,111,123 | 5/1992 | Hach et al. | 318/434 |
| 5,397,967 | 3/1995 | Carobolante et al. | 318/254 |
| 5,444,595 | 8/1995 | Ishikawa et al. | 318/798 X |
| 5,451,832 | 9/1995 | Cameron et al. | 318/254 X |
| 5,678,132 | 10/1997 | Shiba et al. | 318/798 X |

FOREIGN PATENT DOCUMENTS

| | | |
|---|---|---|
| 63-181687 | 7/1988 | Japan . |
| WO 93/14559 | 7/1993 | WIPO . |

OTHER PUBLICATIONS

Evans, Arthur D. et al., "Higher power ratings extend V–MOS FETs'dominion," Electronics, vol. 51, No. 13, Jun. 1978, New York, pp. 105–112.

European Search Report date Oct. 2, 1995.

*Primary Examiner*—Karen Masih
*Attorney, Agent, or Firm*—Morrison & Foerster LLP

[57] ABSTRACT

An inverting amplifier circuit generates a comparison voltage by comparing a smoothed voltage of a voltage across a semiconductor switching element and a setting voltage that is generated by device of a voltage setting volume. An operational amplifier generates a drive signal by comparing the above comparison voltage and a triangular voltage. Negative feedback is effected so that the setting voltage becomes equal to the smoothed voltage, which is inversely proportional to the rotation speed of a DC motor.

18 Claims, 16 Drawing Sheets

DC MOTOR CONTROL CIRCUIT

This application is a continuation of U.S. application Ser. No. 08/475,357, filed Jun. 7, 1995, now abandoned.

BACKGROUND OF THE INVENTION

The present invention relates to a DC motor control circuit suitable for use in power tools that are driven by a DC motor, such as an electric screwdriver, an electric drill, and an electric saw.

FIG. 1 shows a conventional DC motor control circuit of a power tool, in which E denotes a power supply incorporated in a power tool; M, a DC motor; 52, a power supply switch. The power supply switch 52 is closed when the depression amount (stroke) of an operation lever of a power tool has reached a predetermined amount (corresponding to play of the operation lever). When contacts 52a and 52b of the power supply switch 52 are in a state shown in FIG. 1 motor terminals on both sides of the DC motor M are short-circuited and the motor M is thereby braked. To rotate the DC motor M in one direction, only the contact 52a is switched to the state reverse to the state of FIG. 1. And to rotate the DC motor M in the other direction, only the contact 52b is switched to the state reverse to the state of FIG. 1. That is, when only one of the contacts 52a and 52b is switched to the state reverse to the state of FIG. 1, a drive current-. flow through the DC motor M to cause its rotation.

Reference numeral 53 denotes a semiconductor switching element, i.e., a FET. When the operation lever of the power tool is depressed to the maximum stroke, a short-circuit contact 54 is closed to short-circuit the switching portion of the semiconductor switching element 53. In a voltage setting volume 59, a slider slides on a resistive substrate in link motion with the operation lever of the power tool. Thus, the setting volume 59 outputs a setting voltage b that corresponds to the operation amount. A drive signal output circuit 51 consists of a triangular-wave oscillator 57 for generating a triangular-wave voltage a shown in FIG. 2(a) based on a power supply voltage E that is supplied via the power supply switch 52 and diodes 55 and 56, a comparator 58 that receives the triangular-wave voltage a at the inverting input and the setting voltage b at the non-inverting input, and a switching circuit 60 for supplying a drive signal c (see FIG. 2(b)) to the gate of the semiconductor switching element 53 in accordance with a comparison output of the comparator 58.

In the above conventional DC motor control circuit, when the operation lever of the power tool is depressed, the setting voltage b corresponding to the depression amount (stroke) is input to the comparator 58, and the duty cycle of the drive signal c is controlled in accordance with the setting voltage b as shown in FIG. 2(b). Thus, the rotation speed of the DC motor M is controlled.

However, in general, the rotation speed N of the DC motor M and the duty cycle D of the drive signal c have a nonlinear relationship as shown in a characteristic diagram of FIG. 3. And the duty cycle D of the drive signal c and the stroke S of the operation lever have a linear relationship as shown in a characteristic diagram of FIG. 4. Therefore, the relationship between the rotation speed N of the DC motor M and the stroke S of the operation lever is nonlinear, i.e., is represented by a upward-convex curve as shown in FIG. 5.

In general, in fastening a screw by using a power tool, for instance, an electric screwdriver, it is desired that the rotation speed N of the DC motor M be low in the initial stage where positioning is needed. However, with the conventional control circuit, since the rotation speed N and the stroke S have a nonlinear, i.e., upward-convex relationship as shown in FIG. 5, in a low-rotation-speed region an interval of the stroke S for a fixed increase of the rotation speed N of the DC motor M is small, which makes it difficult to perform fine adjustment and causes inconvenience in using the power tool.

To solve the above problem, it may be conceivable to change the shape of a thick-film resistor of the voltage setting volume 59 to provide a nonlinear relationship between the stroke of the operation lever and the resistance. However, this method cannot necessarily provide a desired characteristic.

FIG. 6 shows a conventional motor control circuit similar to the circuit of Fig. 1. Referring to FIG. 6, sliding is effected in a volume VR1 in link motion with an operation switch (not shown). A voltage applied between fixed terminals C and D is divided at an arbitrary ratio, and a resulting divided voltage is output from a movable terminal A. Based on the divided voltage, a voltage setting section (voltage setting circuit) 61, which has resistors R51, R53 and R54, generates a setting signal V0 having a threshold voltage VH (setting voltage). A triangular-wave oscillator 57 generates, in combination with a capacitor C1, a triangular signal V4 having a predetermined period. A comparator 58 compares the setting signal V0 and the triangular signal V4, and outputs a comparison signal V5, based on which a switching circuit 60 produces a signal for driving a switching transistor TR1 that drives a motor M.

A description will be made of the operation of the above motor control circuit. When the operation switch is depressed, a break contact 66 of switch-1 is opened to release braking of the motor M. When the operation switch is further depressed, a make contact 67 of switch-1 is closed to allow application of a power supply voltage (DC voltage) E1 to the respective parts of the circuit. The triangular signal V4 is compared with the setting signal V0. While the triangular signal (voltage) V4 is larger than the threshold voltage VH, i.e., the setting signal (voltage) V0, the transistor TR1 is made on to allow a current to flow through the motor M. That is, the transistor TR1 is made on by a pulse signal having a duty cycle corresponding to the threshold voltage VH. The larger the duty cycle, the larger the average current flowing through the motor M (the motor M rotates at a higher speed).

On the other hand, since the threshold voltage VH of the setting signal V0 is linked with the depression amount (stroke) of the operation switch, the rotation speed of the motor M can be adjusted in accordance with the stroke of the operation switch. When the operation switch is further depressed, a contact 68 of switch-2 is closed. As a result, the power supply voltage E1 is directly applied to the motor M, and the motor M rotates at the maximum speed.

FIG. 7 shows a structure of the volume VR1 used in the circuit of FIG. 6. In FIG. 7, symbols C, D and A correspond to the fixed terminals C and D and the movable terminal A shown in FIG. 6, respectively. A brush 70 that is a movable electrode slides on a fixed electrode having conductor regions 71 and 72 and a resistor region 73 and connected to the terminals C and D and on another fixed electrode 74 connected to the terminal A. That is, the brush 70 connects the two fixed electrodes. When the brush 70 slides on the conductor region 71, the setting signal (voltage) V0 that is input to the comparator 58 has a value determined by dividing the power supply voltage (DC voltage) E1 at the ratio of the resistances R53 and R54, which is the maximum value. Therefore, the comparison signal V5 is 0 V, and the transistor TR1 is off. Thus, the motor M is stopped irrespective of the sliding position of the brush 70 on the conductor region 71.

When the stroke of the operation switch is increased and the brush 70 slides on the resistor region 73, the setting signal(voltage) V0 decreases in accordance with the sliding position of the brush 70. The duty cycle of pulses of the comparison signal V5 in accordance with the decreasing voltage V0, i.e., the stroke of the operation switch. Thus, the rotation speed of the motor M gradually increases. Therefore, the resistor region 73 corresponds to the total speed-variation range.

When the stroke of the operation switch is further increased and the brush 70 slides on the conductor region 72, the setting signal (voltage) V0 is 0 V. Therefore, the duty cycle of pulses of the comparison signal V5 is 100%, and the transistor TR1 is kept on. Thus, the motor M rotates at a constant speed irrespective of the sliding position of the brush 70 on the conductor region 71. When the stroke of the operation switch is further increased, the contact 68 of switch-2 is closed as described above, so that the power supply voltage E1 is directly applied to the motor M and the motor M rotates at the maximum speed.

Therefore, a power tool can be properly used for an intended work by adjusting the depression amount, i.e., the stroke of the operation switch.

However, in the above conventional motor control circuit, there may occur a problem that although the depression amount of the operation switch is within the total speed-variation range, actually the motor M does not rotate or its rotation speed does not reach a value suitable for an intended work.

FIG. 26 shows how the comparison output V5 is generated with respect to the stroke of the operation switch. At a time point when the setting signal (voltage) V0 becomes smaller than the triangular signal V4 (see FIG. 26(a)), the comparison output V5 turns active (see FIG. 26(b)). In FIG. 26, t0 represents a time point when the operation switch is started to be depressed, t1 represents a time point when the rotation speed adjusting range (corresponding to the resistor region 73 of FIG. 7) is reached, and t2 represents a time point when the contact 68 of switch-2 is closed. As is apparent from FIG. 26(b), in the beginning part of the total speed-variation range, the comparison output V5 is not generated or a duty cycle for a prescribed rotation speed is not obtained.

FIG. 27 shows a relationship between the stroke of the operation switch and the motor rotation speed. A chain line indicates a characteristic of the conventional motor control circuit. As shown in FIG. 27, the contact 67 of switch-1 is closed at a stroke position S0, the total speed-variation range S starts at a stroke S1, and the contact 68 of switch-2 is closed at a stroke S3. Symbol Na denotes an effective rotation speed range which allows for proper working.

As is apparent from FIG. 27, with the characteristic of the conventional motor control circuit, between a range from S1 to S2 of the total speed-variation range S, the motor M does not rotate and just hums. Further, even after it starts to rotate, the rotation speed does not reach the effective rotation speed range Na soon. That is, there exists an ineffective speed-variation range Sb which does not contribute to working. As such, an effective speed-variation range Sa is narrow, which may result in a reduced efficiency of working.

SUMMARY OF THE INVENTION

The present invention has been made in view of the above circumstances, and has an object of providing a DC motor control circuit which can reduce a variation of the rotation speed of a DC motor with respect to a variation of the stroke in an initial rotation stage of the DC motor, to thereby improve the ease of operation of a power tool.

Another object of the invention is to provide a DC motor control circuit which can prevent a semiconductor switching element from being damaged when an overcurrent flows through the semiconductor switching element or abnormal heating occurs there.

A further object of the invention is to provide a motor control circuit which can improve the working efficiency by widening the effective speed-variation range.

To attain the above objects, according to a first aspect of the invention, there is provided a DC motor control circuit comprising:

a DC motor;

a semiconductor switching element connected to the DC motor, for controlling a current flowing through the DC motor;

a voltage setting section for providing a setting voltage;

a first comparing circuit for comparing a voltage across the semiconductor switching element and the setting voltage, and producing a comparison signal;

a reference voltage generating circuit for generating a reference voltage signal; and a second comparing circuit for comparing the reference voltage signal and the comparison signal, and producing a drive signal for controlling switching of the semiconductor switching element.

With the above configuration, negative feedback is effected so that the setting voltage becomes equal to the voltage across the semiconductor switching element, which is inversely proportional to the motor rotation speed in a no-load state. Therefore, the relationship between the rotation speed N of the DC motor and the stroke S of an operation lever can be made linear in contrast to the upward-convex relationship of the conventional control circuit (see FIG. 5). As a result, the interval of the stroke S for a fixed increase of the rotation speed N of the DC motor in a low-rotation-speed region becomes wider than in the conventional control circuit, thereby providing a power tool with improved ease of operation and increasing its working efficiency.

The DC motor control circuit may further comprise a voltage correction circuit for correcting the setting voltage by a nonlinear characteristic. In this case, the relationship between the rotation speed N of the DC motor and the stroke S of the operation lever can be made a downward-convex characteristic. As a result,. the interval of the stroke S for a fixed increase of the rotation speed N of the DC motor in a low-rotation-speed region becomes further wider than in the conventional control circuit, thereby providing a power tool with further improved ease of operation.

The DC motor control circuit may further comprise a switch circuit for supplying the voltage across the semiconductor switching element to the first comparing circuit while the semiconductor switching element is off. In this period, the voltage across the semiconductor switching element is inversely proportional to the rotation speed of the DC motor. In this case, it becomes possible to cause the DC motor to rotate at a speed corresponding to the setting voltage even at the occurrence of a torque variation (constant speed operation)

According to a second aspect of the invention, there is provided a DC motor control circuit comprising:

a DC motor;

a semiconductor switching element connected to the DC motor, for controlling a current flowing through the DC motor;

a driving circuit for producing a drive signal for controlling switching of the semiconductor switching element; and a protection circuit for comparing a voltage across the semiconductor switching element and a predetermined voltage while the semiconductor switching element is on, and forcing the driving circuit to turn off the semiconductor switching element if the voltage across the semiconductor switching element is larger than the predetermined voltage.

With this configuration, when the voltage across the semiconductor switching element increases due to an overcurrent flows through it or its abnormal heating, the protection circuit operates to turn off the semiconductor switching element. Therefore, the semiconductor switching element ca be prevented from operating incorrectly or being damaged.

According to a third aspect of the invention, there is provided a DC motor control circuit comprising:

a DC motor;

an operation switch;

voltage generating means comprising:

first and second conductor regions between which a DC power supply voltage is applied;

a resistor region. located between the first and second conductor regions;

first, second and third electrodes disposed adjacent to the first and second conductor regions and the resistor region, respectively;

a movable contact for connecting the first conductor region and the first electrode, the resistor region and the third electrode, or the second conductor region and the second electrode;

an output terminal connected to the first and second electrodes; and a resistor connected between the third electrode and the output terminal;

a voltage setting section for moving the movable contact in accordance with an operation amount of the operation switch for providing a setting voltage based on a voltage at the output terminal of the voltage generating means; and a control circuit for controlling a rotation speed of the motor based on the setting voltage.

With this configuration, the effective speed-variation range can be widened. Since working by use of a power tool can be started at a rotation speed suitable for it, thus improving the working efficiency.

DESCRIPTION OF THE PREFERRED EMBODIMENTS

Embodiments of the present invention will be described with reference to the accompanying drawings.

Figure 8:
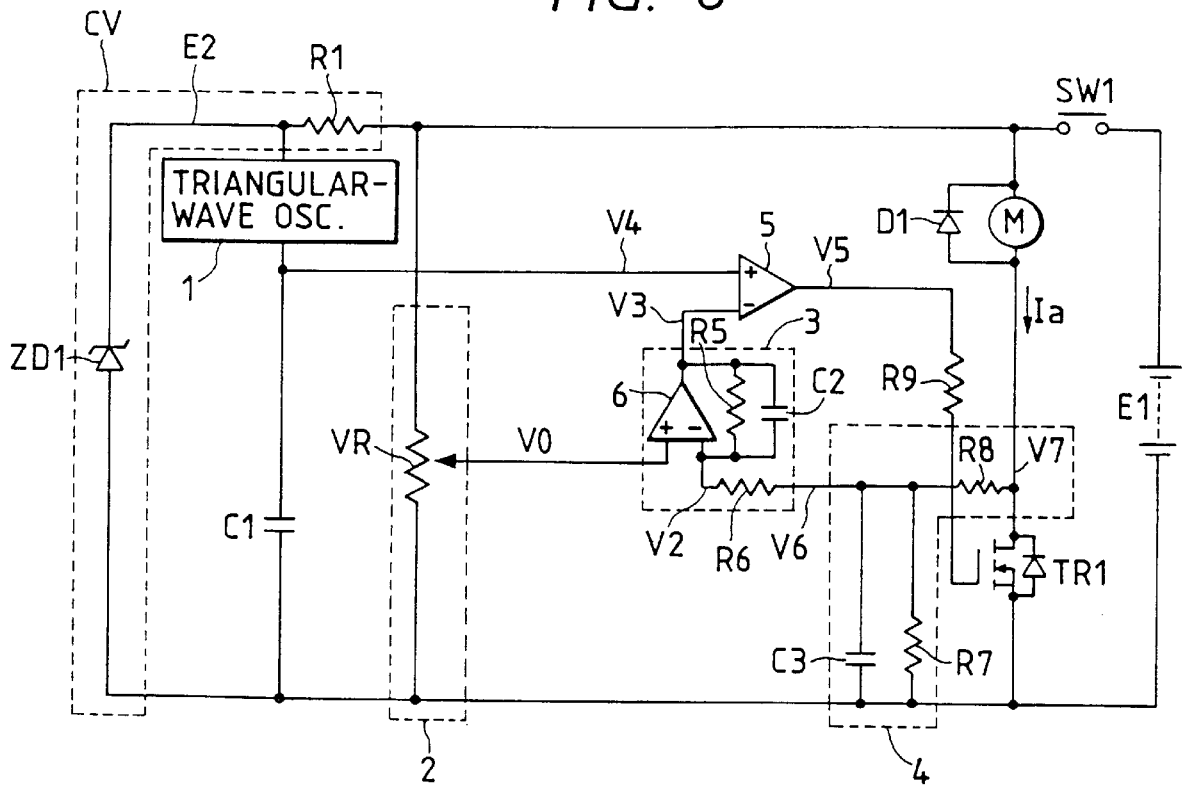
FIG. 8 shows a DC motor control circuit according to an embodiment of the present invention.

FIG. 8 shows a DC motor control circuit according to an embodiment of the invention, which is incorporated in a power tool.

In FIG. 8, a constant voltage circuit CV, which is a series connection of a resistor R1 and a Zener diode ZD1, generates a prescribed constant voltage E2 at the cathode of the Zener diode ZD1 based on a voltage E1 of a power supply that is incorporated in the power tool. The voltage E1 is supplied via a switch SW1 for supplying/cutting off a drive current.

A triangular-wave oscillator (reference voltage generating circuit) 1 generates, in combination with an oscillation capacitor C1, a triangular voltage V4.

A speed setting section 2, which sets a rotation speed of a DC motor M, has a voltage setting volume VR. A movable terminal of the voltage setting volume VR moves in link motion with depression of an operation lever of the power tool, and outputs a setting voltage V0 -that corresponds to the depression amount (stroke).

An inverting amplifier circuit (first comparison circuit) 3 consists of an operational amplifier 6, resistors R5 and R6, and a capacitor C2. The operational amplifier 6 receives the setting voltage V0 from the voltage setting volume VR at the non-inverting input and a smoothed voltage V6 from a smoothing circuit 4 at the inverting input, and outputs as a drive signal a voltage V3 that corresponds to a difference between the received voltages.

Having voltage-dividing resistors R7 and R8, and a capacitor C3, the smoothing circuit 4 smooths a voltage V7 across a semiconductor switching element TR1, and supplies the smoothed voltage V6 to the inverting input of the operational amplifier 6.

The semiconductor switching element TR1 is a FET, and its switching portion D-S is provided between the power supply E1 and the DC motor M. More specifically, the drain D is connected to one terminal of the DC motor M and the source S is connected to the minus electrode of the power supply E1. The gate of the semiconductor switching element TR1 is supplied with a drive signal V5 from an operational amplifier (second comparison circuit) 5 via a current limiting resistor R9.

The triangular voltage V4 as output from the triangular-wave oscillator 1 is input to the non-inverting input of the operational amplifier 5, and the output voltage V3 of the inverting amplifier circuit 3 is input to its inverting input. Comparing the voltages V4 and V3, the operational amplifier 5 generates a comparison output, which is supplied to the gate of the semiconductor switching element TR1 as the drive signal V5. A protection diode D1 is connected in parallel to the DC motor M.

Figure 9:
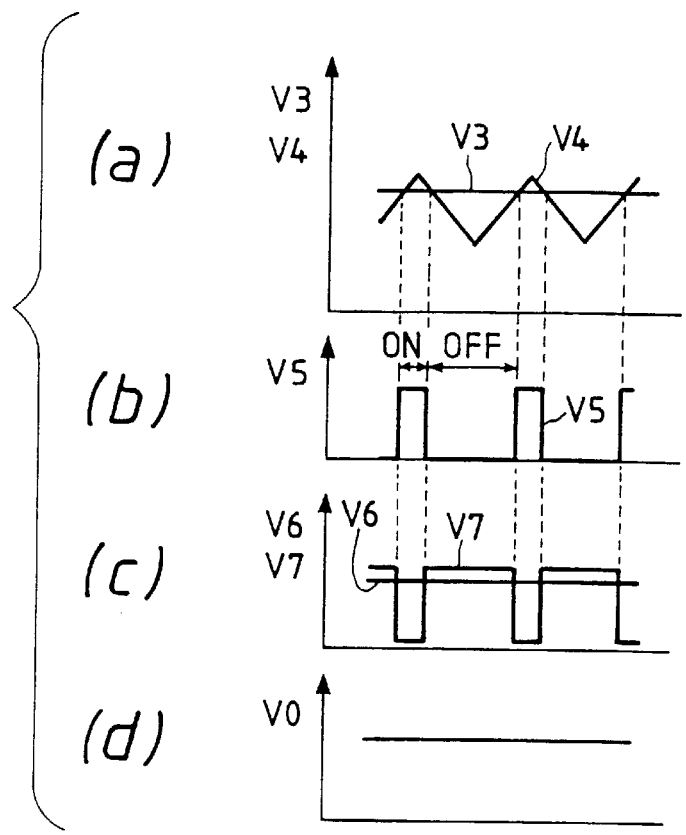
FIGS. 9 and 10 are signal waveforms in a no-load operation of the embodiment of FIG. 8.
Figure 10:
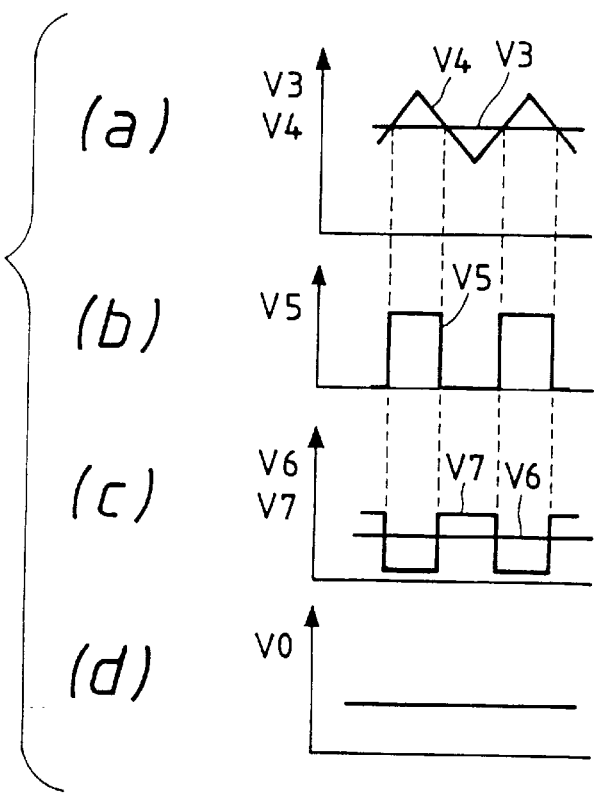

Referring to FIGS. 9 and 10, a description will be made of a no-load operation of the DC motor control circuit having the above configuration. In each of these drawings, part (a) shows the output voltage of the inverting amplifier circuit 3 which is input to the operational amplifier 5 and the triangular voltage V4, part (b) shows the output voltage (drive signal) V5 of the operational amplifier 5, part (c) shows the voltage V7 across the semiconductor switching element TR1 and the smoothed voltage V6 thereof, and part (d) shows the setting voltage V0 of the voltage setting volume VR. FIGS. 9 and 10 correspond to two states where the setting voltage V0 of the voltage setting volume VR is different.

In this embodiment, the voltage V0 corresponding to the depression amount (stroke) of the operation lever is supplied from the voltage setting volume VR to the non-inverting input of the operational amplifier 6 of the inverting amplifier circuit 3, and the smoothed voltage V6 of the voltage V7 across the semiconductor switching element TR1 is supplied to the same operational amplifier 6. The operational amplifier 6 supplies the output voltage V3, which corresponds to a difference between the voltages V0 and V6 to the inverting input of the operational amplifier 5. The operational amplifier 5 supplied the voltage V5, which corresponds to a difference between the voltage V3 being input to the inverting input and the triangular voltage V4 being input to the non-inverting input, to the gate of the semiconductor switching element TR1 as the drive signal. The semiconductor switching element TR1 is on/off-controlled by the voltage V5, and the driving of the DC motor M is thereby controlled.

In short, the smoothed voltage V6 of the voltage V7 across the semiconductor switching element TR1 is compared with the setting voltage V0 of the voltage setting volume VR, and the resulting comparison output V3 is then compared with the triangular voltage V4. The resulting comparison output (drive signal) V5 is used to control the semiconductor switching element TR1. Therefore, as shown in parts (c) and (d) of each of FIGS. 9 and 10, the control is so made that the setting voltage V0 of the voltage setting volume VR becomes equal to the smoothed voltage V6 of the voltage V7 across the semiconductor switching element TR1.

Now, a description will be made of a relationship between the smoothed voltage V6 of the voltage V7 across the semiconductor switching element TR1 and the rotation speed N of the DC motor M.

Figure 11:
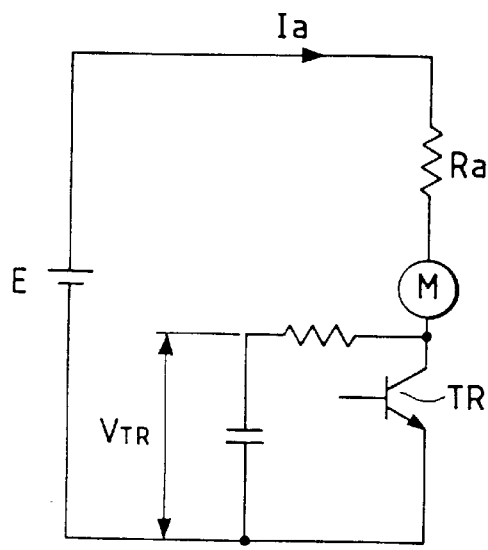
FIG. 11 is a circuit diagram for explanation of a general relationship between a voltage across a semiconductor switching element and the rotation speed of a DC motor.

As shown in FIG. 11, assume a case where a switching element TR is connected to e. DC motor M whose armature has a winding resistance Ra and a power supply voltage E is applied to the motor M. With a notation that Ia is a drive current;

$K_E$, a proportion constant specific to the motor M; N, a rotation speed of the motor M; and $V_{TR}$, an average of a voltage across the switching element TR, the power supply voltage E is generally expressed as $$E = Ia \cdot Ra + K_E \cdot N + V_{TR}. \quad\quad\quad (1)$$

Therefore, the average $V_{TR}$ of the voltage across the switching element TR is $$V_{TR} = E - Ia \cdot Ra - KE \cdot N.$$

In the no-load state of the DC motor M, Ia·Ra is negligible and the power supply voltage E and the proportion constant $K_E$ are constant. Therefore, the average $V_{TR}$ of the voltage across the switching element TR is inversely proportional to the rotation speed N of the DC motor M.

Therefore, according to the embodiment of FIG. 8, during a no-load operation of the DC motor M, the control is so made that the smoothed voltage V6 of the voltage V7 across the semiconductor switching element TR1, which is inversely proportional to the rotation speed N of the DC motor M, becomes equal to the setting voltage V0 of the voltage setting volume VR. That is, the rotation speed N of the DC motor M can be made proportional to the stroke of the operation lever of the power tool, which corresponds to the setting voltage V0.

Figure 12:
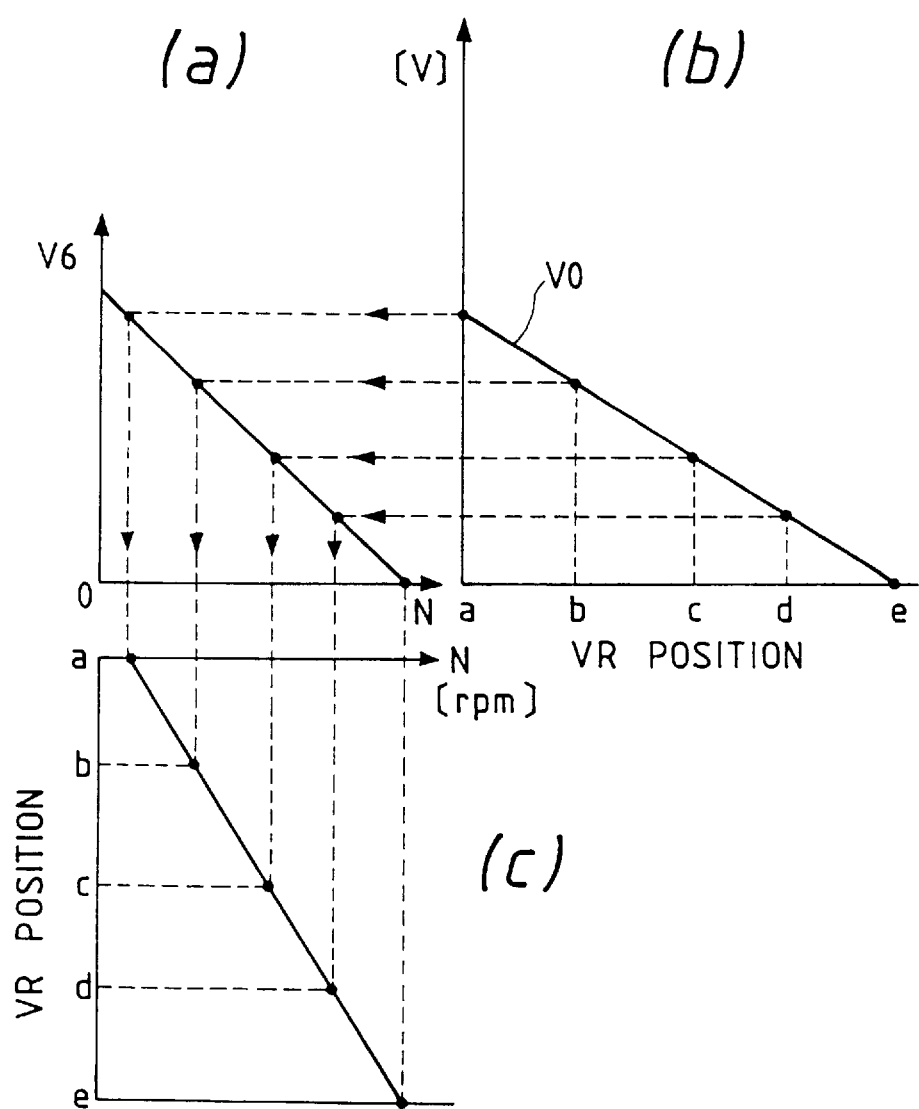
FIG. 12 is a characteristic diagram showing a relationship among the setting position of a voltage setting volume, its setting voltage, a smoothed voltage of a voltage across a semiconductor switching element, and the rotation speed of a DC motor in the embodiment of FIG. 8.

FIG. 12 is a characteristic diagram showing a relationship among the setting position (corresponding to the stroke) of the voltage setting volume VR, the setting voltage V0, the smoothed voltage V6 of the voltage V7 across the semiconductor switching element TR1, and the rotation speed N of the DC motor M in this embodiment.

Part (a) of FIG. 12 is a characteristic diagram showing a relationship between the rotation speed N of the DC motor M and the smoothed voltage V6 of the voltage V7 across the semiconductor switching element TR1. Part (b) shows a characteristic diagram showing a relationship between the setting position of the voltage setting volume VR and the setting voltage V0. Part (c) is a characteristic diagram showing a relationship between the setting position of the voltage setting volume VR and the rotation speed N of the DC motor M.

As shown in FIG. 12(b), the setting voltage V0 is inversely proportional to the setting position of the voltage setting volume VR, which corresponds to the depression amount of the operation lever. That is, the setting voltage V0 decreases as the depression amount increases.

On the other hand, the smoothed voltage V6 of the voltage V7 across the semiconductor switching element TR1 is so controlled as to become equal to the setting voltage V0, and the rotation speed N of the DC motor M is inversely proportional to the smoothed voltage V6 of the voltage V7 across the semiconductor switching element TR1 as shown in FIG. 12(a). Therefore, as shown in FIG. 12(c), a proportional relationship is established between the setting position of the voltage setting volume VR (see FIG. 12(b)) and the rotation speed N of the DC motor M, which corresponds to the smoothed voltage V6 that is equal to the setting voltage V0.

Figure 1:
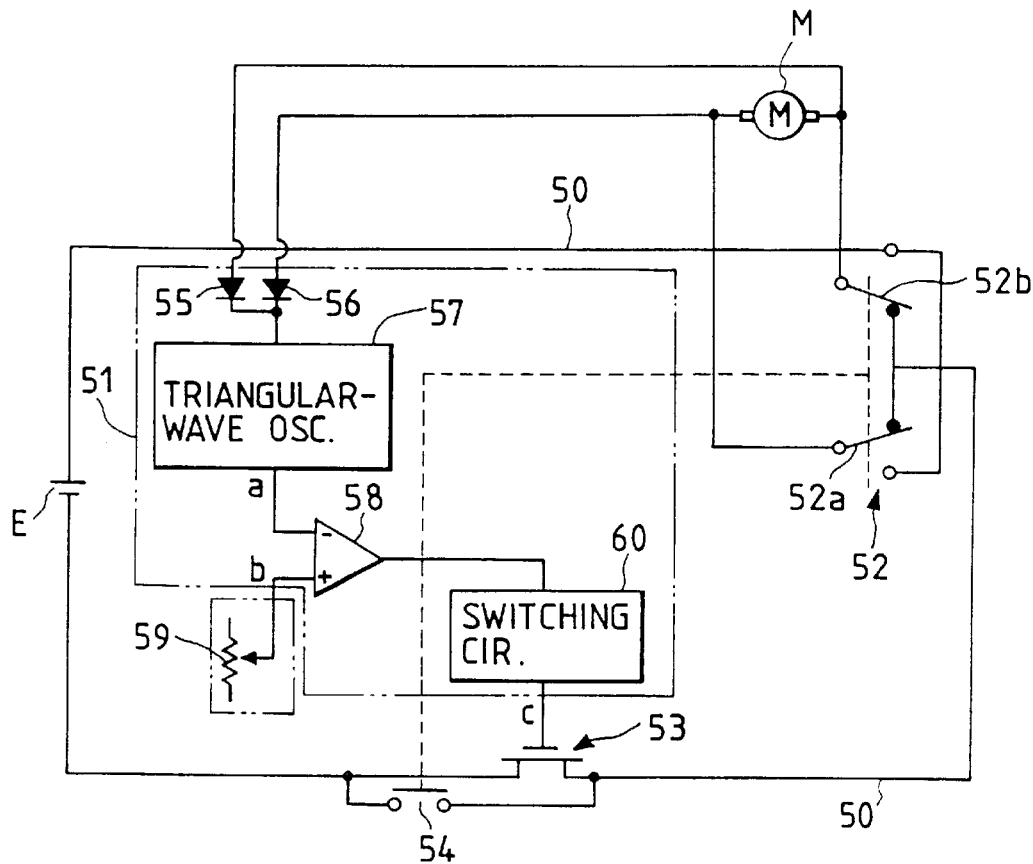
FIG. 1 shows a conventional DC motor control circuit of a power tool.
Figure 2:
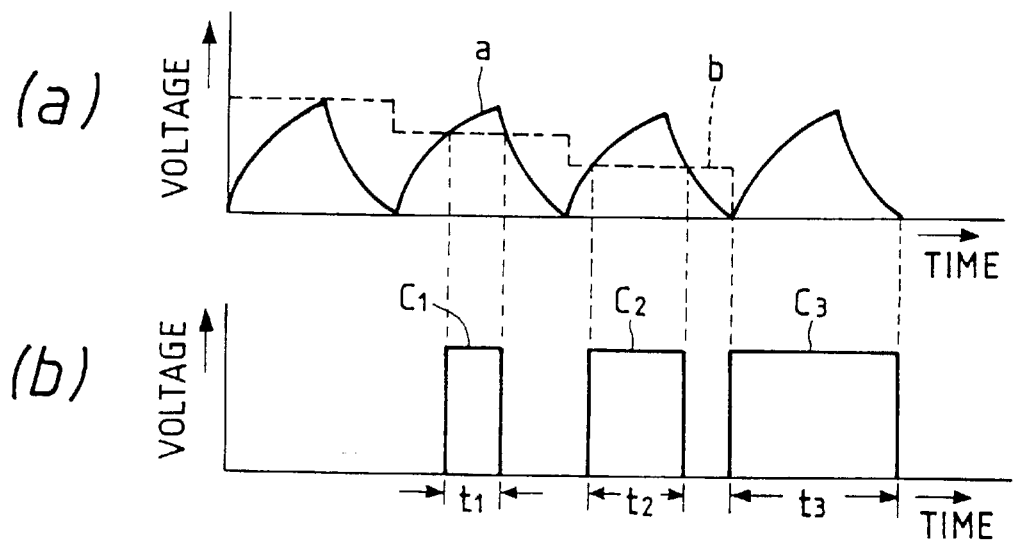
FIG. 2 shows signal waveforms of the conventional DC motor control circuit of FIG. 1.
Figure 3:
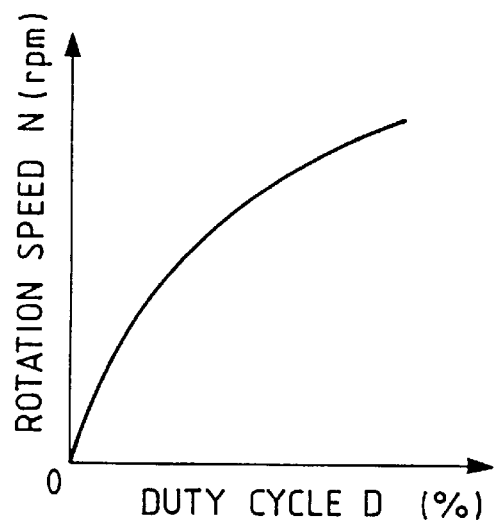
FIG. 3 is a characteristic diagram showing a relationship between a rotation speed of a DC motor and a duty cycle of a drive signal.
Figure 4:
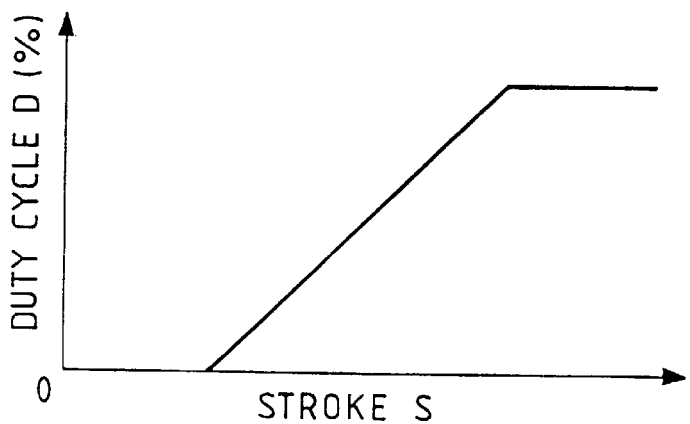
FIG. 4 is a characteristic diagram showing a relationship between a stroke of an operation lever and the duty cycle of the drive signal.
Figure 5:
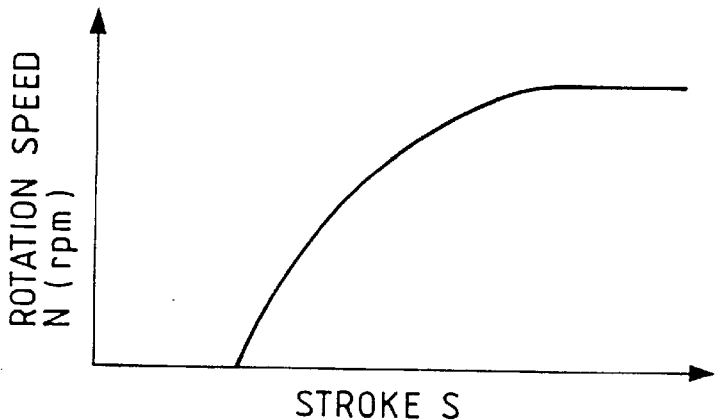
FIG. 5 is a characteristic diagram showing a relationship between the stroke of the operation lever and the motor rotation speed.
Figure 6:
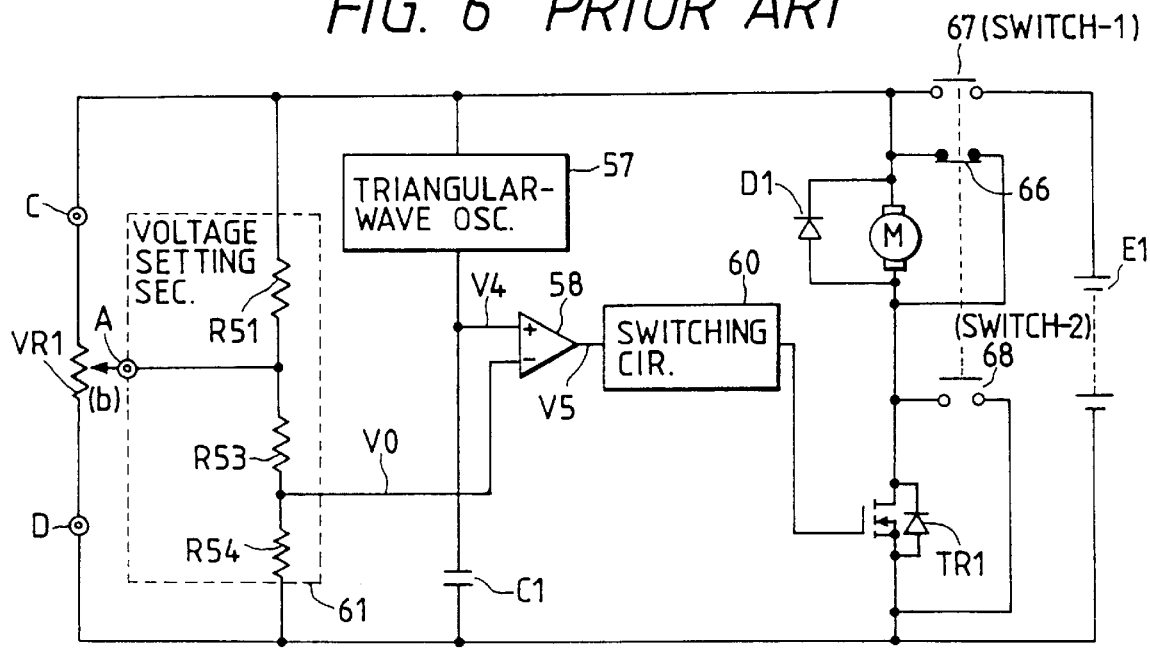
FIG. 6 is another conventional motor control circuit.
Figure 7:
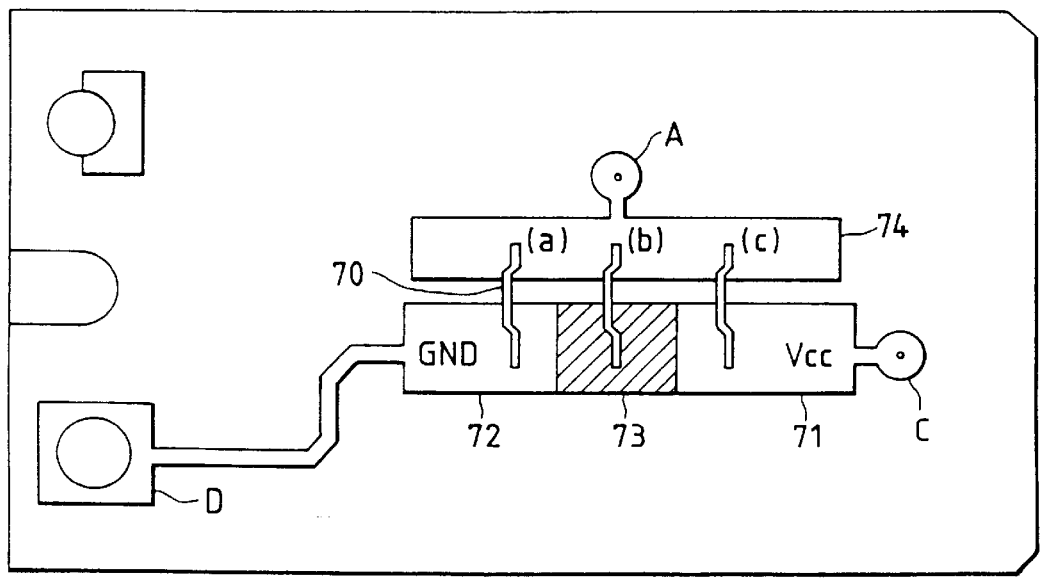
FIG. 7 shows a structure of a conventional volume used in the circuit of FIG. 6.

In the conventional control circuit, since the rotation speed N of the DC motor M and the stroke S have a nonlinear, i.e., upward-convex relationship as shown in FIG. 5, in a low-rotation-speed region an interval of the stroke S for a fixed increase of the rotation speed N is small, which makes it difficult to perform fine adjustment and causes inconvenience in using the power tool. In contrast, according to this embodiment, as shown in FIG. 12(c), a linear relationship is established between the rotation speed N of the DC motor M and the stroke S (corresponding to the setting position of the voltage setting volume VR). As a result, the interval of the stroke S for a fixed increase of the rotation speed N of the DC motor M in a low-rotation-speed region becomes wider than in the conventional control circuit, providing improved ease of operation.

Figure 13:
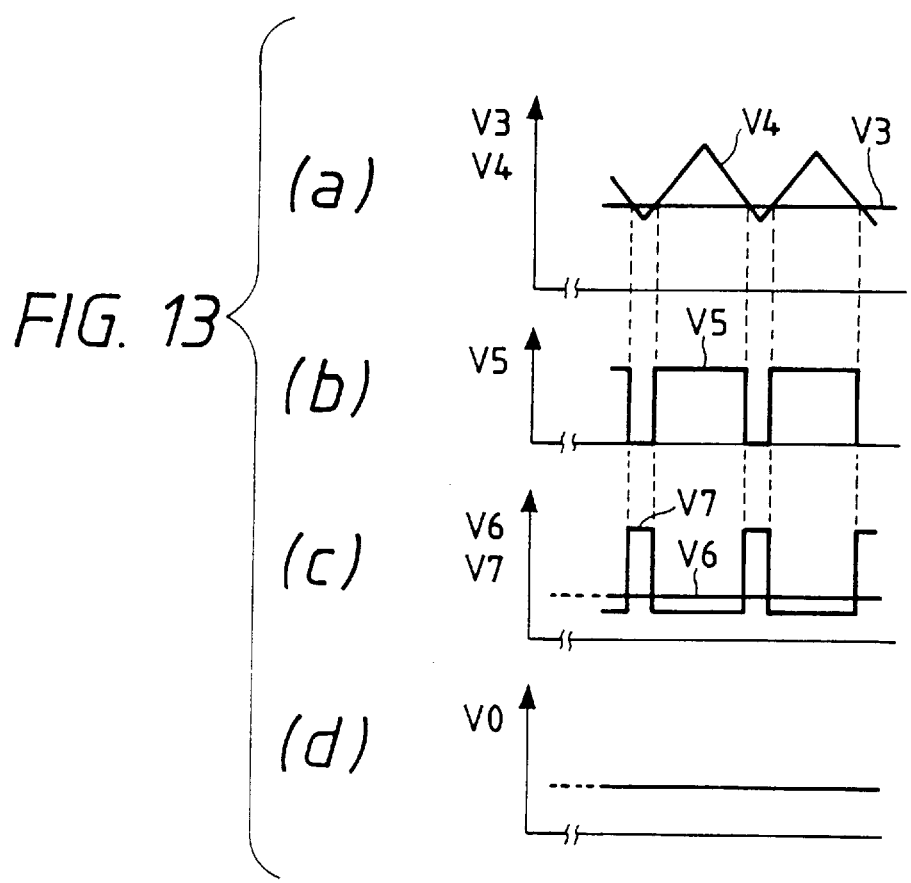
FIG. 13 are signal waveforms in a loaded operation of the embodiment of FIG. 8.

Further, in this embodiment, negative feedback is so effected that the smoothed voltage V6 of the voltage V7 across the semiconductor switching element TR1 becomes equal to the setting voltage V0 of the voltage setting volume VR. Therefore, when transition is made from the no-load operation state of FIG. 10 to a loaded operation state of FIG. 13, feedback is so made that the smoothed voltage V6 is kept at the setting voltage V0. As a result, the level of the output voltage V3 of the inverting amplifier circuit 3 is reduced as shown in FIG. 13(a), so that the duty cycle of the output voltage (drive signal) V5 of the operational amplifier 5 is increased. Thus, the degree of decrease of the rotation speed N of the DC motor M is reduced.

Figure 14:
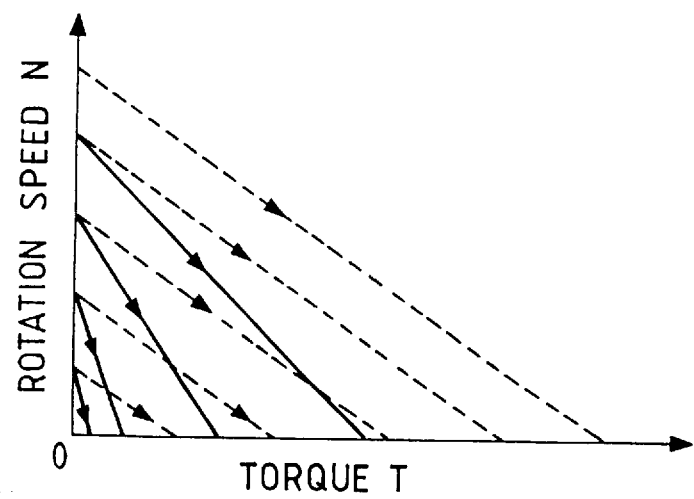
FIG. 14 is a characteristic diagram showing a relationship between the motor rotation speed and the generated torque.

FIG. 14 is a characteristic diagram showing a relationship between the rotation speed N of the DC motor M and generated torque T, which corresponds to a load. Solid lines indicate a characteristic of the conventional control circuit and dashed lines indicate a characteristic of this embodiment.

As indicated by the dashed lines, in this embodiment, as the load increases, feedback is so effected as to increase the duty cycle as described above. Therefore, the state of the DC motor M changes, until reaching a locking state, along a gentler curve. Thus, the DC motor M operates more stably, to improve the ease of operation.

Figure 15:
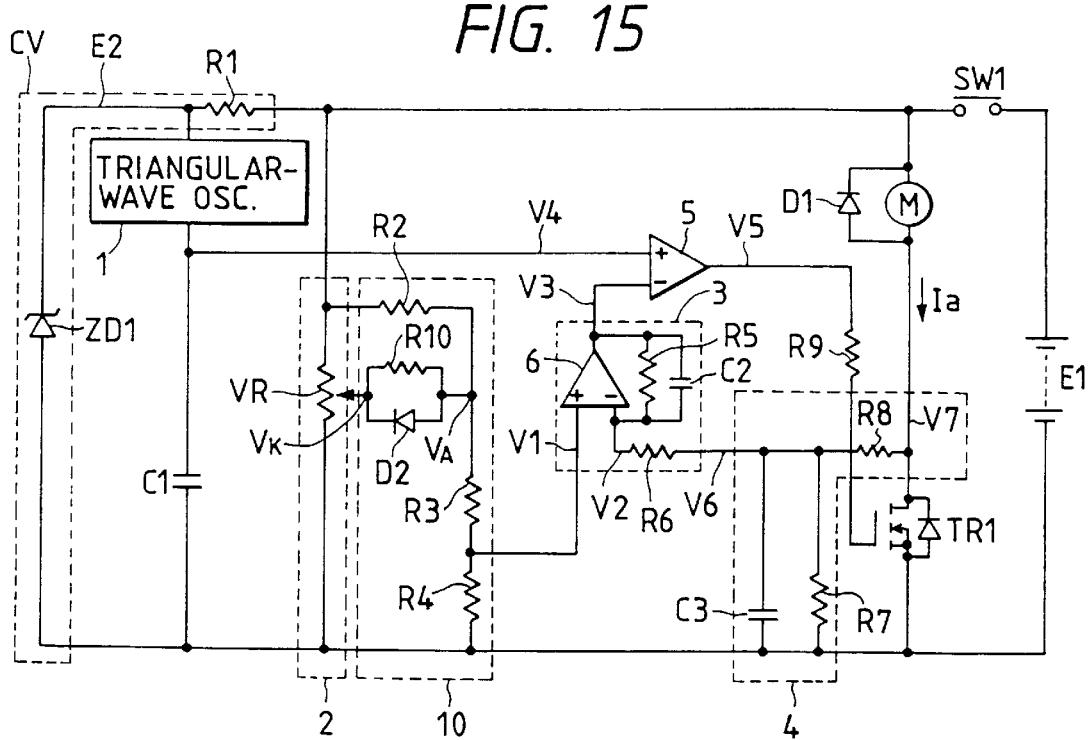
FIG. 15 is a characteristic diagram showing a DC motor control circuit according to another embodiment of the invention.

FIG. 15 shows a DC motor control circuit according to another embodiment of the invention, in which parts corresponding to those in FIG. 8 are given the same reference symbols.

The DC motor control circuit of this embodiment is intended to further improve the ease of operation by establishing a nonlinear, downward-convex relationship between the rotation speed of the motor M and the stroke S in contrast to the linear relationship Of the above embodiment. To this end, a voltage correction circuit 10 is provided which corrects the setting voltage of the voltage setting volume VR by using a nonlinear characteristic described later and supplies the corrected setting voltage to the non-inverting input of the operational amplifier 6. The remaining configuration is the same as the above embodiment.

In the voltage correction circuit 10, voltage dividing resistors R2–R4 are provided between the two terminals of the voltage setting volume VR. A parallel circuit of a voltage dividing resistor R10 and a diode D2 is provided between the movable terminal of the voltage setting volume VR and the connecting point of the voltage dividing resistors R2 and R3. The connecting point of the voltage dividing resistors R3 and R4 is connected to the non-inverting input of the inverting amplifier circuit 3.

The operation of the voltage correction circuit 10 will be described with reference to a characteristic diagram of FIG. 16.

Figure 16:
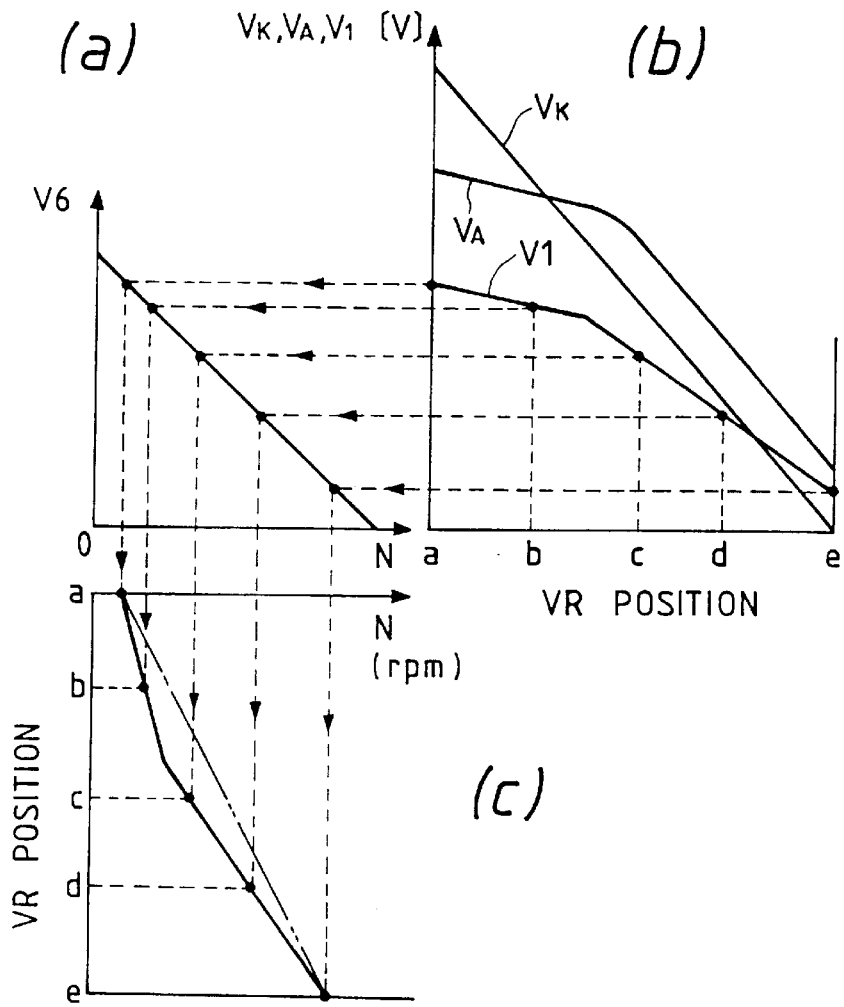
FIG. 16 is a characteristic diagram showing a relationship among the setting position of the voltage setting volume, its setting voltage, the smoothed voltage of the voltage across the semiconductor switching element, and the rotation speed of the DC motor in the embodiment of FIG. 15.

Part (a) of FIG. 16 is a characteristic diagram showing a relationship between the rotation speed of the DC motor M and the smoothed voltage V7 of the voltage V6 across the semiconductor switching element TR1. Part (b) is a characteristic diagram showing a relationship between the setting position of the voltage setting volume VR and a cathode voltage $V_K$ Of the diode D2, its anode voltage VA, and a corrected voltage V1. Part (c) is a characteristic diagram showing a relationship between the setting position of the voltage setting volume VR and the rotation speed N of the DC motor M.

As shown in FIG. 16 (b), the cathode voltage $V_K$ of the diode D2, which corresponds to the setting voltage of the voltage setting volume VR, is inversely proportional to the setting position of the voltage setting volume VR. On the other hand, when the depression amount of the operation lever is increased to make the anode voltage $V_A$ of the diode D2 reach a prescribed voltage, the diode D2 is turned on and the anode voltage $V_A$ becomes 0.6 V higher than the cathode voltage $V_K$. The anode voltage $V_A$ having such a value is divided by the resistors R3 and R4 to produce the corrected voltage V1. Thus, in this embodiment, the characteristic of the diode D2 serves to produce a nonlinear relationship between the setting position of the voltage setting volume VR and the corrected voltage V1.

On the other hand, the smoothed voltage V6 of the voltage V7 across the semiconductor switching element TR1 is so controlled as to become equal to the corrected voltage V1, and the rotation speed N of the DC motor M is inversely proportional to the smoothed voltage V6 of the voltage V7 across the semiconductor switching element TR1 as shown in FIG. 16(a). Therefore, as shown in FIG. 16(c), a nonlinear, downward-convex relationship is established between the setting position of the voltage setting volume VR (see FIG. 16(b)) and the rotation speed N of the DC motor M, which corresponds to the smoothed voltage V6 that is equal to the corrected voltage V1.

That is, according to this embodiment, as shown in FIG. 16(c), a nonlinear, downward-convex relationship is established between the rotation speed N of the DC motor M and the stroke S (corresponding to the setting position of the voltage setting volume VR). As a result, the interval of the stroke S for a fixed increase of the rotation speed N of the DC motor M in a low-rotation-speed region becomes wider than in the conventional control circuit, providing further improved ease of operation.

The diode D2 may be replaced by a Zener diode, to constitute another embodiment of the invention.

Figure 17:
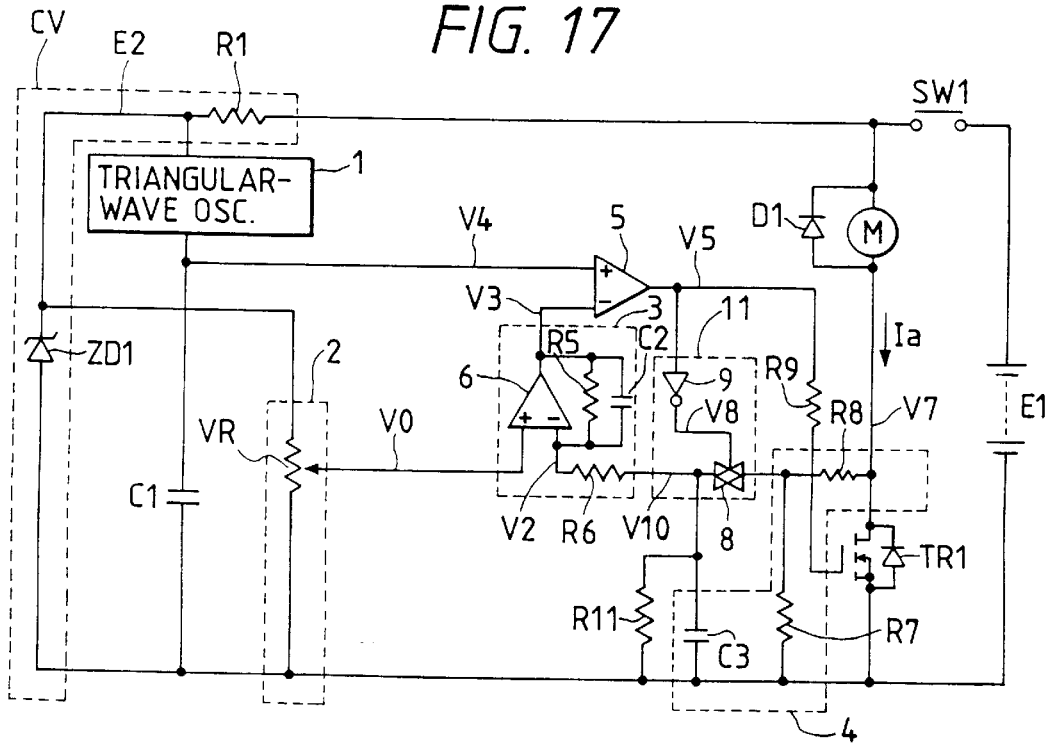
FIG. 17 shows a DC motor control circuit according to another embodiment of the invention.

FIG. 17 shows a DC motor control circuit according to still another embodiment of the invention, in which the parts corresponding to those in the embodiment of FIG. 8 are given the same reference symbols.

Figure 18:
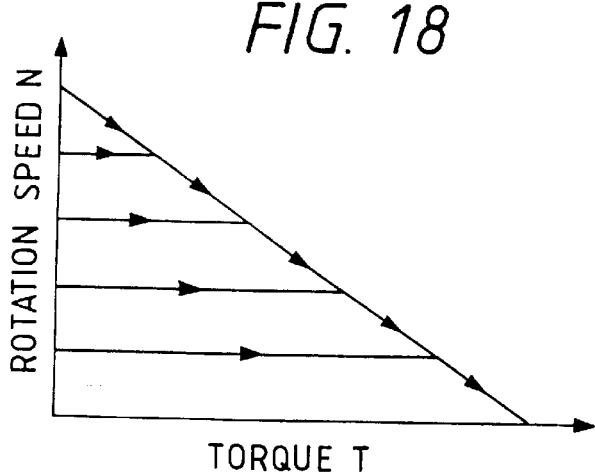
FIG. 18 is a characteristic diagram showing a relationship between the motor rotation speed and the generated torque in the embodiment of FIG. 17.

As shown in a characteristic diagram of FIG. 18, this embodiment is intended to realize constant speed control for causing the DC motor M to rotate at a constant speed even in the event of a load variation. To this end, the following configuration is employed.

In this embodiment, a switching circuit 11 for picking up the voltage V7 across the semiconductor switching element TR1 while it is off, is provided between the smoothing circuit 4 for smoothing the voltage V7 across the semiconductor switching element TR1 and the inverting input of the operational amplifier 6 of the inverting amplifier circuit 3. The switching circuit 11 has an inverter 9 that receives an output of the operational amplifier 5 and an analog switch 8 that is on/off-controlled by an output of the inverter 9. To prevent the analog switch 8 from being rendered in an indefinite state while it is completely off, a discharging resistor R11 is provided in parallel with the smoothing capacitor C3. The remaining configuration is the same as the embodiment of FIG. 8.

In this embodiment, the switching circuit 11 picks up the voltage V7 across the semiconductor switching element TR1, which is inversely proportional to the rotation speed N of the DC motor M, during its off period, to produce a smoothed voltage V10.

Referring to Equation (1), since the drive current Ia is 0 while the semiconductor switching element TR1 is off, the average voltage $V_{TR}$ of the semiconductor switching element TR1 is inversely proportional to the rotation speed N of the DC motor M even at the occurrence of a load variation.

In this embodiment, since the smoothed voltage V10 of the voltage V7 across the semiconductor switching element TR1 is input to the inverting amplifying circuit 3 during the off period of the semiconductor switching element TR1, the rotation speed N of the DC motor M is kept at a value corresponding to the setting voltage V0 of the voltage setting volume VR even at the occurrent of a load variation. That is, constant speed control is attained.

Figure 19:
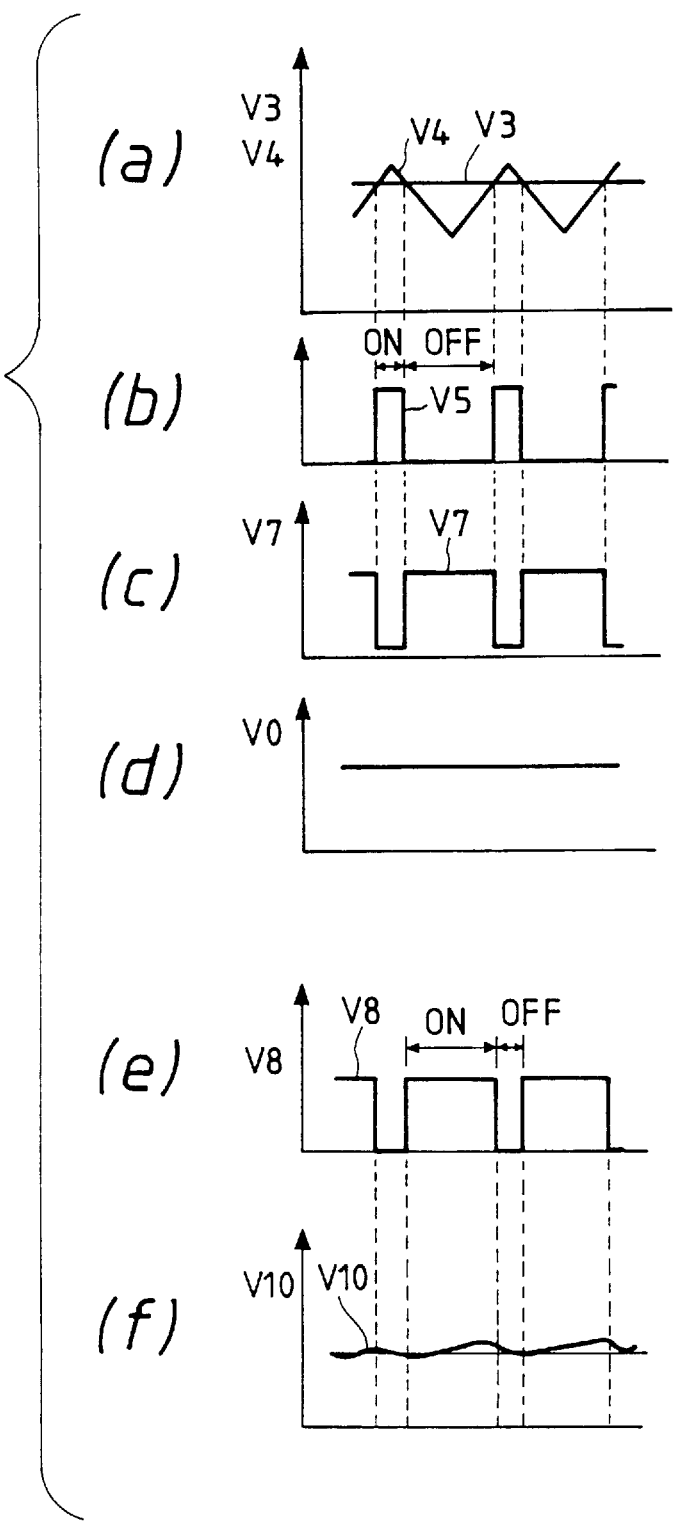
FIG. 19 shows signal waveforms in the embodiment of FIG. 17, and corresponds to FIG. 9.
Figure 20:
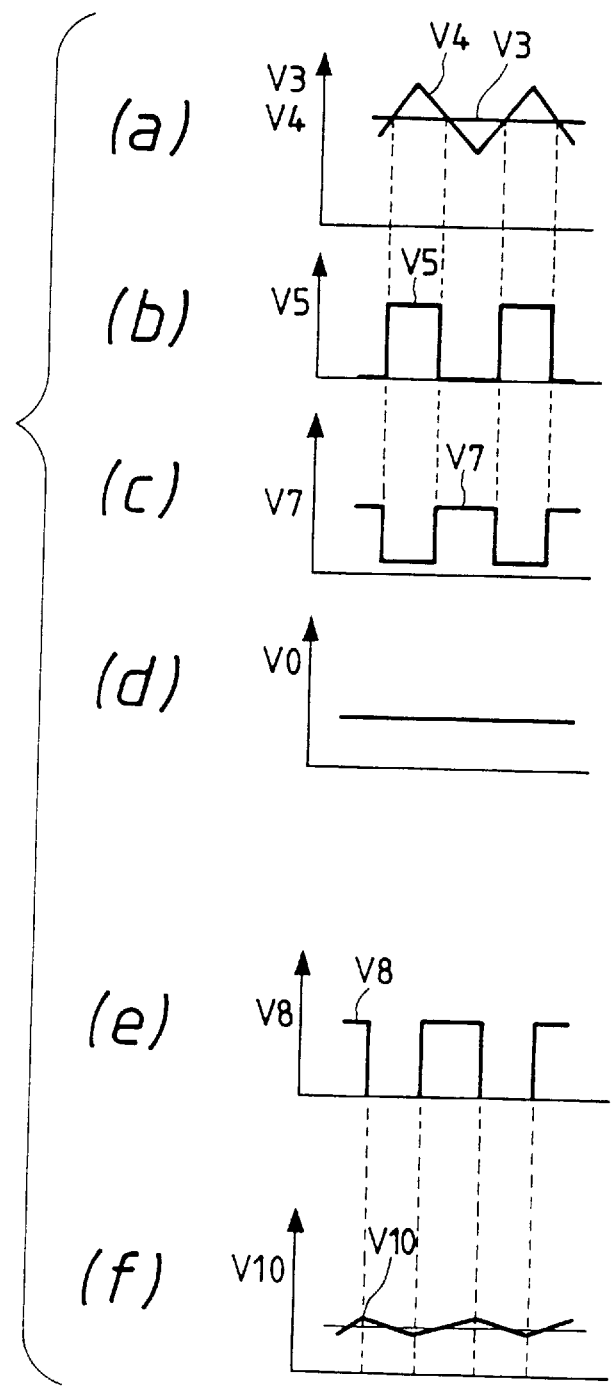
FIG. 20 shows signal waveforms in the embodiment of FIG. 17, and corresponds to FIG. 10.
Figure 21:
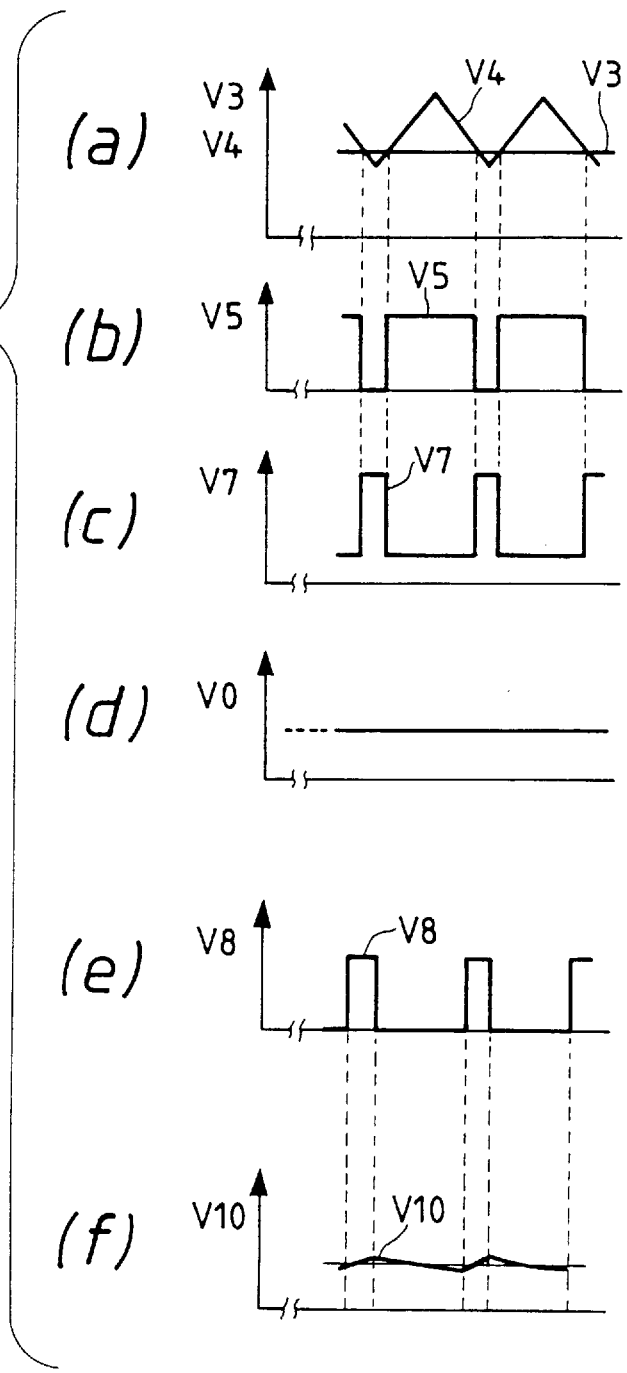
FIG. 21 shows signal waveforms in the embodiment of FIG. 17, and corresponds to FIG. 13.

FIGS. 19–21 are signal waveform diagrams corresponding to FIGS. 9, 10 and 13 of the FIG. 8 embodiment, respectively. In each of FIGS. 19–21, part (e) shows the output voltage V8 of the inverter 9, and part (f) shows the smoothed voltage V10 of the voltage V7 across the semiconductor switching element TR1.

Figure 22:
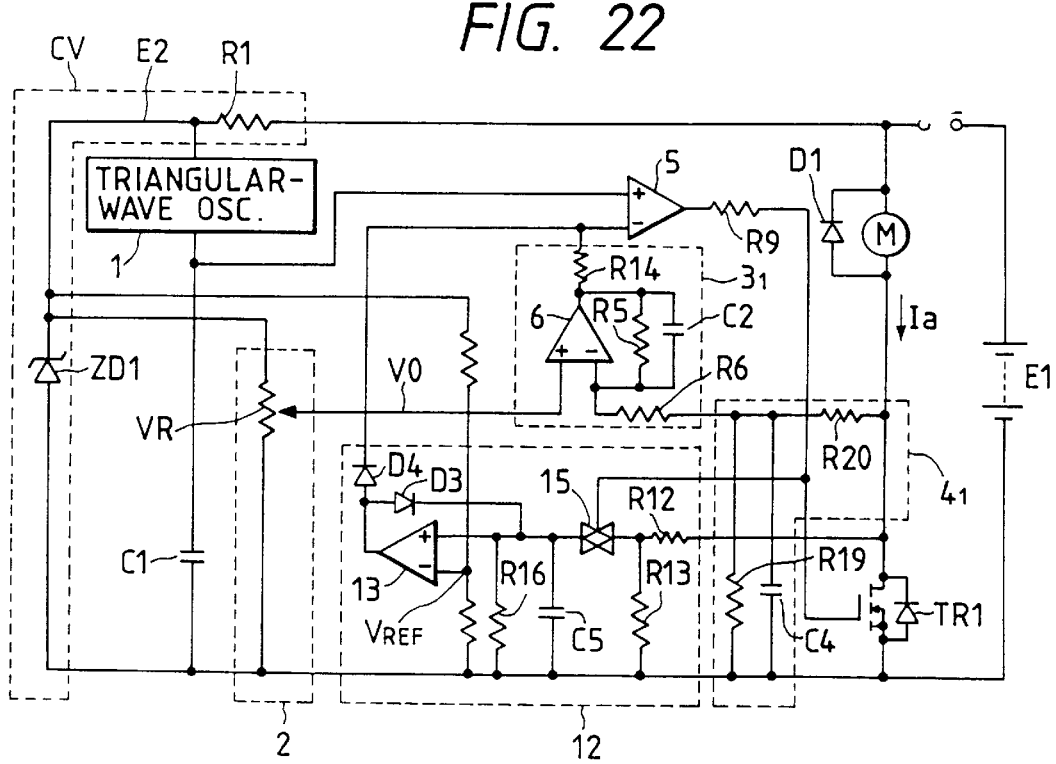
Fig. 22 shows a DC motor control circuit according to still another embodiment of the invention.

FIG. 22 shows a DC control circuit according to still another embodiment of the invention, in which the parts corresponds to those in FIG. 8 are given the same reference symbols.

In this embodiment, a smoothing circuit 41 for smoothing the voltage across the semiconductor switching element TR1 consists of voltage dividing resistors R19 and R20 and a smoothing capacitor C4. An inverting amplifier circuit $3_1$ that receives a smoothed voltage from the smoothing circuit $4_1$ has a resistor R14 on the output side of the operational amplifier 6.

As in the case of the FIG. 8 embodiment, this embodiment can establish a linear relationship between the rotation speed N of the motor M and the stroke, to improve the ease of operation. Further, this embodiment is provided with a protection circuit 12 for protecting the semiconductor switching element TR1 by forcibly turning it off when an overcurrent flows through it or abnormal heating occurs there. The protection circuit 12 smooths the voltage across the semiconductor switching element TR1 while it is on, and compares a smoothed voltage with a reference voltage. If the smoothed voltage is larger than the reference voltage, the protection circuit 12 forcibly turns off the semiconductor switching element TR1.

The protection circuit. 12 has an analog switch 15 that is on/off-controlled by the output of the operational amplifier 5, voltage dividing resistors R12 and R13, a smoothing capacitor C5, a discharging resistor R16 for preventing the analog switch 15 from being rendering an indefinite state when it is completely off, a self-holding diode D3, and a reverse-blocking diode D4. The protection circuit 12 further has an operational amplifier 13 that receives a reference voltage $V_{REF}$ at the inverting input and a smoothed voltage of the voltage across the semiconductor switching element TR1 at the non-inverting input.

When an excessively large drive current flows due to an overload, the voltage across the semiconductor switching element TR1 becomes larger than the reference voltage $V_{REF}$ in the protection circuit 12. In response, the output of the operational amplifier 13 becomes high, to forcibly make the output of the operational amplifier 5 low. Thus, the semiconductor switching element TR1 is turned off, i.e., protected.

When the semiconductor switching element TR1 heats up and its temperature is increased, its resistance is increased accordingly. Therefore, the semiconductor switching element TR1 heats up due to a long-term flow of a large drive current, the voltage across it becomes larger than the reference voltage $V_{REF}$. Thus, the semiconductor switching element TR1 is forcibly turned off as in the case of an overcurrent.

That is, the protection circuit 12 serves both as a current limiter and a thermal limiter.

Although this embodiment is constituted by providing the protection circuit 12 in the configuration of the FIG. 8 embodiment, the protection circuit 12 may be provided in the conventional configuration to provide another embodiment of the invention.

Although the triangular-wave oscillator 1 is employed as the reference voltage generating circuit in each of the above embodiments, the invention is not limited to the case of using the triangular voltage, but a constant reference voltage, for instance, may also be used.

Figure 23:
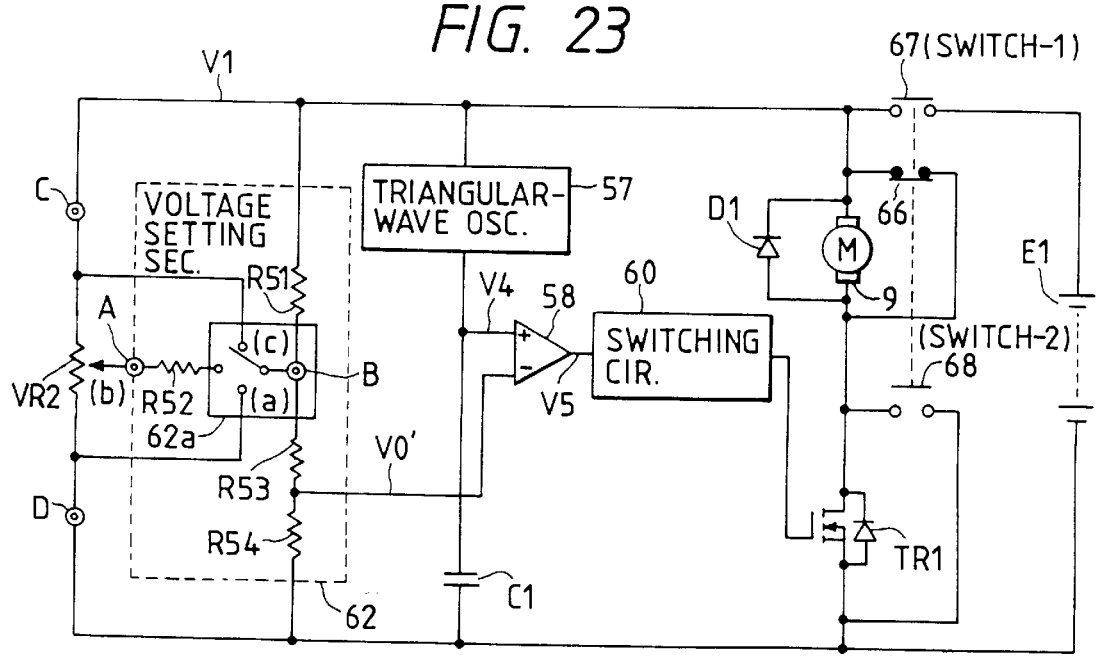
Fig.23 shows a motor control circuit according to another embodiment of the invention.

FIG. 23 shows a motor control circuit according to another embodiment of the invention. Referring to FIG. 23, sliding is effected in a volume VR2 in link motion with an operation switch (for instance, trigger-shaped; not shown). A voltage applied between fixed terminals C and D is divided at an arbitrary ratio, and a resulting divided voltage is output from a movable terminal A. Based on the divided voltage, a voltage setting section (voltage setting circuit) 62, which has a resistor R52, a switch 62a, resistors R51, R53 and R54, generates a setting signal V0' having a threshold voltage VH (setting voltage). The switch 62a is formed on the same printed circuit board as the volume VR2 (described later).

A triangular-wave oscillator 57 generates, in combination with a capacitor C1, a triangular signal V4 having a predetermined period. A comparator 58 compares the setting signal V0' and the triangular signal V4, and outputs a comparison signal V5, based on which a switching circuit 60 produces a signal for driving a switching transistor TR1 that drives a motor M.

A description will be made of the operation of the motor control circuit of this embodiment. When the operation switch is depressed, a break contact 66 of switch-l is opened to release braking of the motor M. When the operation switch is further depressed, a make contact 67 of switch-1 is closed to allow application of a power supply voltage (DC voltage) E1 to the respective parts of the circuit. The triangular signal V4 is compared with the setting signal V0'. While the triangular signal (voltage) V4 is larger than the threshold voltage VH, i.e., the setting signal (voltage) V0', the transistor TR1 is made on to allow a current to flow through the motor M. That is, the transistor TR1 is made on by a pulse signal having a duty cycle corresponding to the threshold voltage VH of the setting signal V0'. The larger the duty cycle, the larger the average current flowing through the motor M (the motor M rotates at a higher speed). On the other hand, since the setting signal V0' is linked with the depression amount (stroke) of the operation switch, the rotation speed of the motor M can be adjusted in accordance with the stroke of the operation switch. When the operation switch is further depressed, a make contact 68 of switch-2 is closed. As a result, the power supply voltage E1 is directly applied to the motor M, and the motor M rotates at the maximum speed.

Figure 24:
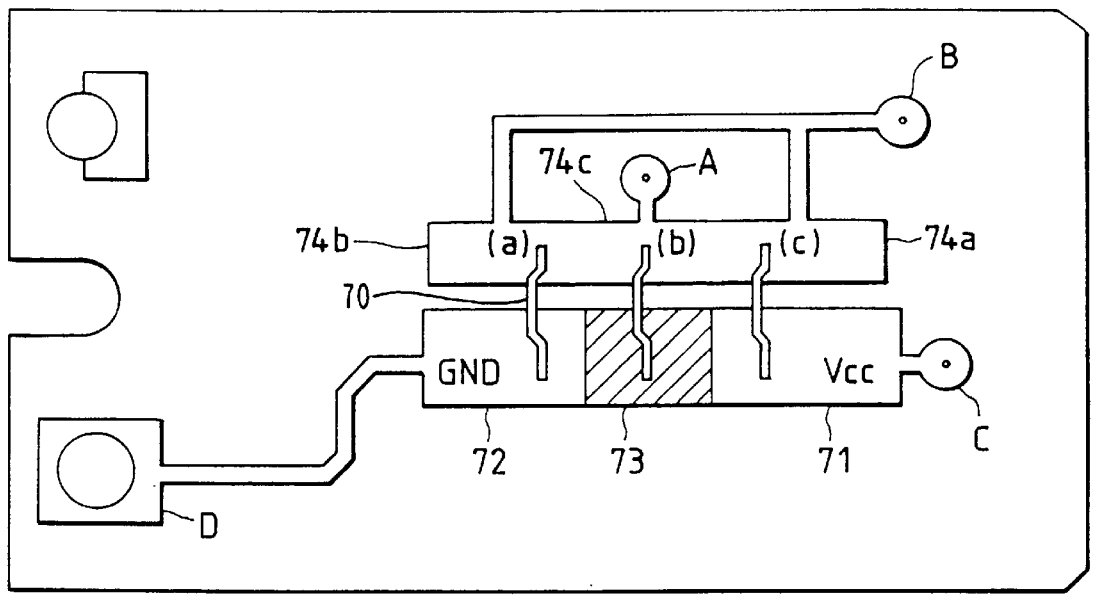
FIG. 24 shows a structure of a volume and a switch of a voltage setting section shown in FIG. 23.

FIG. 24 shows a structure of the volume VR2 and the switch 62a of the voltage setting section 62 used in the circuit of FIG. 23. In FIG. 24, symbols B, C, D and A correspond to the fixed terminals B, C and D and the movable terminal A shown in FIG. 23, respectively. A brush 70 slides on a fixed electrode having conductor regions 71 and 72 and a resistor region 73 and connected to the terminals C and D, region (c) of a fixed electrode 74a connected to the terminal B, region (b) of the fixed electrode 74b connected to the terminal A, and region (a) of a fixed electrode 74c also connected to the terminal B. Gaps are provided between the three fixed electrodes 74a, 74b and 74c to electrically isolate those electrodes from each other. Since the brush 70 is somewhat wider than those gaps, it short-circuits adjacent two electrodes when it is located at the center of the gap between those adjacent electrodes. When the brush 70 moves between the three separated fixed electrodes 74a, 74b and 74c, changeover is effected in the switch 62a of the voltage setting section 62. The brush 70 serves as a movable contact of the switch 62a. That is, a state that the movable contact of the switch 62a is connected to contact (a) in FIG. 23 corresponds to a state that the brush 70 is located on region (a) of the fixed electrode 74b. Similarly, a state that the movable contact of the switch 62a is connected to contact (b) in FIG. 23 corresponds to a state that the brush 70 is located on region (b) of the fixed electrode 74c, and a state that the movable contact of the switch 62a is connected to contact (c) in FIG. 23 corresponds to a state that the brush 70 is located on region (c) of the fixed electrode 74a.

Figure 25:
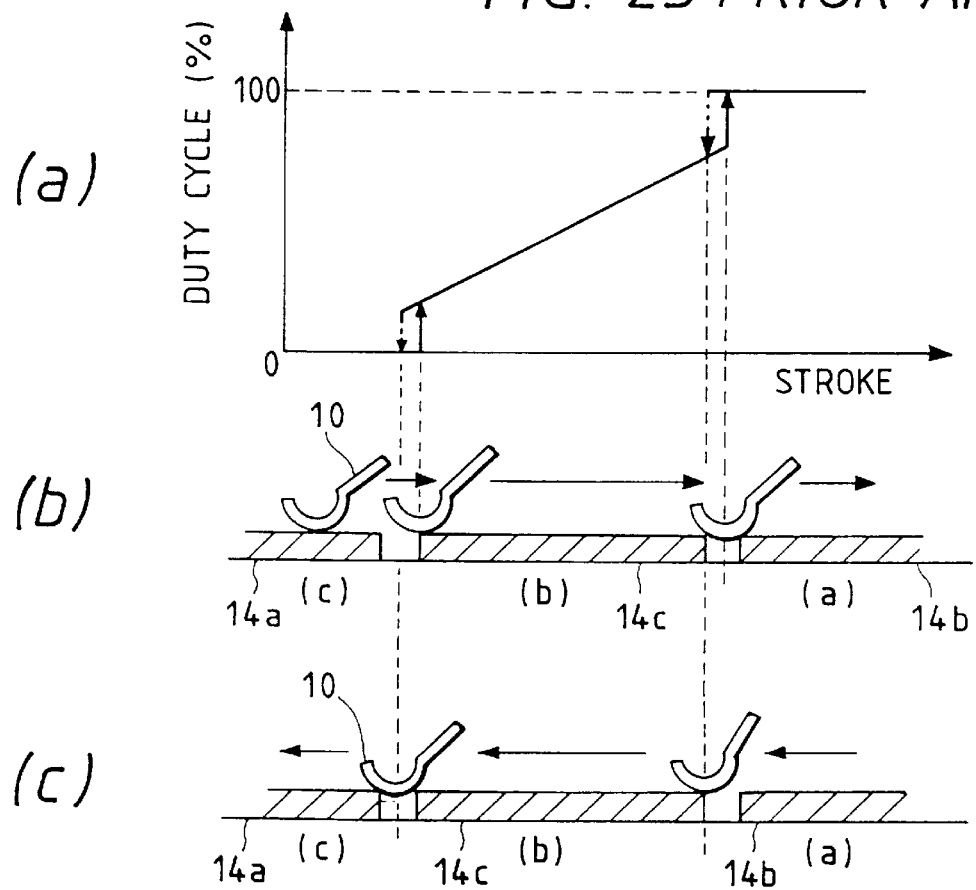
FIG. 25 shows a relationship between the sliding position of a brush that corresponds to the stroke and the duty cycle of a comparison output.

FIG. 25 shows a relationship between the sliding position of the brush 70 that corresponds to the stroke and the duty cycle of the comparison signal V5. Part (a) of FIG. 23 shows a stroke-duty cycle relationship, part (b) shows how the brush 70 slides as the stroke is increased (the operation switch is depressed increasingly), and part (c) shows how the brush 70 slides as the stroke is decreased (the operation switch is returned).

Referring to FIGS. 23–25, a description will be made of how the duty cycle of the comparison signal V5 is varied. When the operation switch is depressed and the brush 70 is thereby placed on region (c), the terminals B of the switch 62a is connected to the terminal C. Therefore, the setting signal (voltage) V0' that is input to the comparator 58 has a value determined by dividing the power supply voltage E1 at the ratio of the resistances R53 and R54, which is the maximum value. The duty cycle is 0%. When the brush 70 is further moved, it is placed on region (b) of the fixed electrode 74c, which corresponds to the state that the movable contact of the switch 62a is connected to the resistor R52 (see FIG. 23). At this time, the setting signal (voltage) V0', which is determined by circuit conditions including the volume VR2 and the resistances R51–R54, becomes smaller than the triangular signal V4. As a result, the duty cycle of the comparison signal V5 increases abruptly as shown in FIG. 25(a). While the brush 70 slides on region (b), the dividing ratio of the resistance of the volume VR2 is changed (see FIG. 23) and the duty cycle increases in proportion to the sliding position. When the brush 70 has reached the position of bridging regions (b) and (a) to short-circuit those regions, the terminal D is connected to the terminal B of the switch 62a (see FIG. 23). Therefore, the setting signal (voltage) becomes 0 V, and the duty cycle abruptly increases to 100% as shown in FIG. 25(a). In short, the duty cycle varies as indicated by a solid line in FIG. 25(a) as the operation is depressed increasingly.

When the operation switch is then somewhat returned and the brush 70 is moved from region (a) to region (b), the duty cycle abruptly drops from 100% as shown in FIG. 25(a). When the brush 70 has reached the position of bridging regions (b) and (c) to short-circuit those regions, the terminal C is connected to the terminal B of the switch 62a (see FIG. 23). Therefore, the threshold voltage VH of the setting signal V0'has the maximum value, and the duty cycle abruptly drops to 0% as shown in FIG. 25(a). In short, the duty cycle varies as indicated by a dashed line in FIG. 25(a) as the operation switch is returned.

In the circuit of FIG. 23, switch-1 and switch-2 directly open and close the path of current flowing through the motor M. Therefore, durability of those switches needs to be considered. From this point of view, the following conditions should be satisfied.

Condition 1: The duty cycle should be 0% when switch-1 is closed or opened.

Condition 2: The duty cycle should be 100% when switch-2 is closed or opened.

To satisfy the above conditions, the following settings are employed between the brush 70 and switch-1 and switch-2.

Setting 1: Switch-1 is closed or opened when the brush 70 is located on region (c) or at the position of bridging regions (c) and (b) to short-circuit those regions (see part (b) and (c) of FIG. 25).

Setting 2: Switch-2 is closed or opened when the brush 70 is located on region (a) or at the position of bridging regions (b) and (a) to short-circuit those regions (see part (b) and (c) of FIG. 25).

Figure 26:
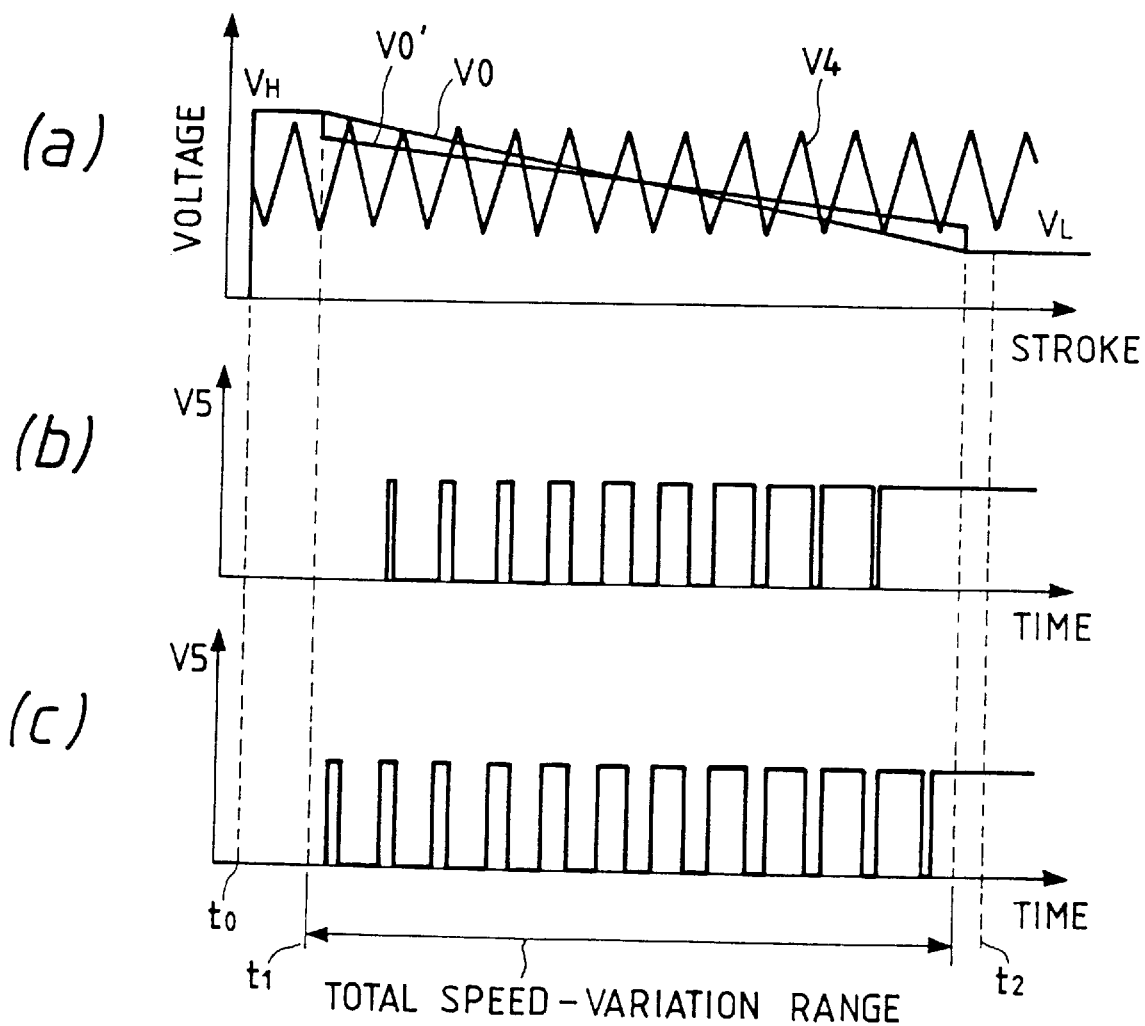
FIG. 26 shows how a comparison signal is generated with respect to the stroke of an operation switch.

As described above, FIG. 26 shows how the comparison signal V5 is generated with respect to the stroke of the operation switch. At a time point when the setting signal (voltage) V0', becomes smaller than the triangular signal v4 (see FIG. 26(a)), the comparison output V5 turns active (see FIG. 26(b)). In FIG. 26, t0 represents a time point when the operation switch is started to be depressed, t1 represents a time point when the brush 70 moves from region (c) to region (b), and t2 represents a time point when the contact 68 of switch-2 is closed. As is apparent from FIG. 26(c), in contrast to the conventional case of FIG. 26(b), the comparison signal V5 is generated over almost the entire speed-variation range in this embodiment.

Figure 27:
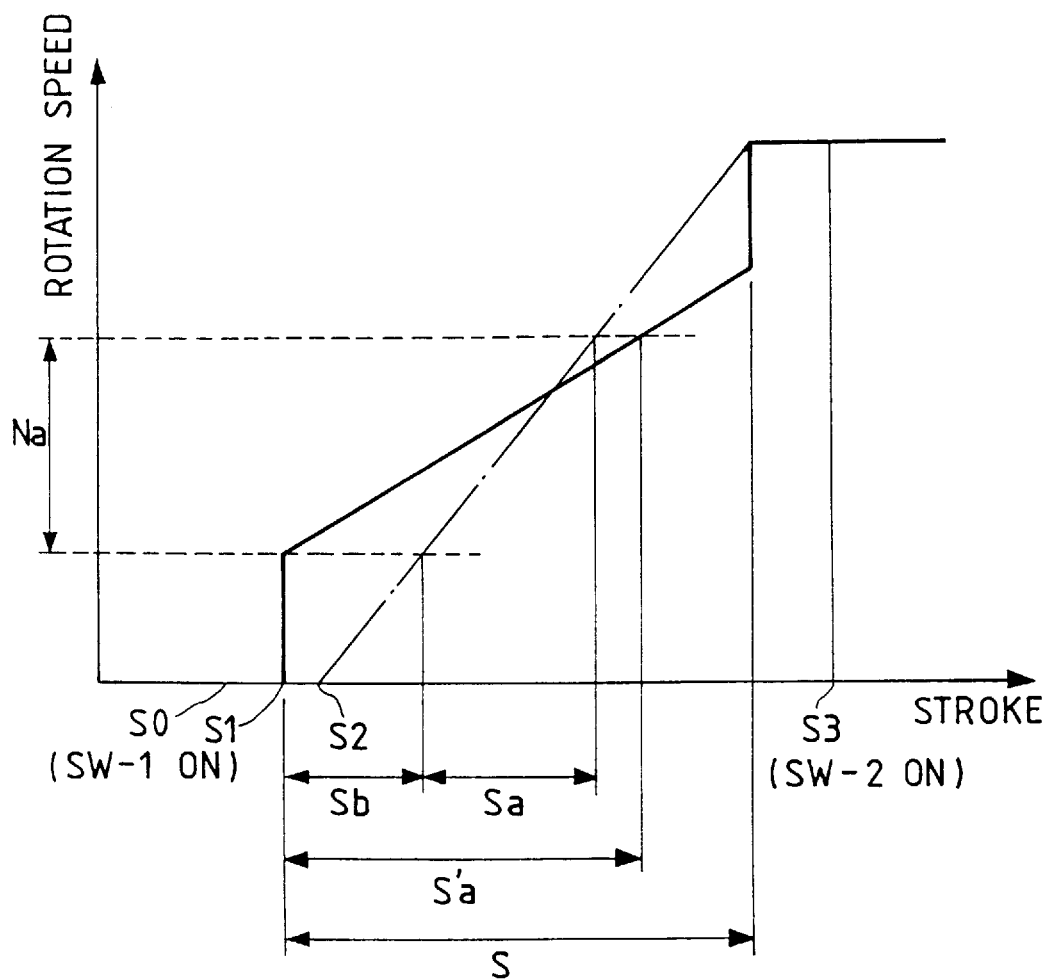
FIG. 27 shows a relationship between the stroke of the operation switch and the motor rotation speed.

FIG. 27 shows the relationship between the stroke of the operation switch and the motor rotation speed. A characteristic of the motor control circuit of this embodiment indicated by a solid line. In FIG. 27, the contact 67 of switch-1 is closed at a stroke S0, the total speed-variation range S begins at a stroke S1., and the contact 68 of switch-2 is opened at a stroke S3. Symbol Na denotes an effective rotation speed range which allows for proper working.

As is apparent from FIG. 27, with the characteristic of the motor control circuit, the rotation speed abruptly increases to reach the effective rotation speed range Na when the stroke reaches the total speed-variation range S. Further, an effective speed-variation range Sa' that contributes to working is much wider than the conventional effective speed-variation range Sa.

What is claimed is:

1. A DC motor control circuit comprising:
   a DC motor;
   a semiconductor switching element connected to the DC motor, for controlling a current flowing through the DC motor;
   a voltage setting section for providing a setting voltage;
   a first comparing circuit for comparing a voltage across the semiconductor switching element and the setting voltage, and producing a comparison signal;
   a reference voltage generating circuit for generating a reference voltage signal; arid
   a second comparing circuit for comparing the reference voltage signal and the comparison signal, and producing a drive signal for controlling switching of the semiconductor switching element.

2. The DC motor control circuit of claim 1, further comprising a smoothing circuit for supplying the first comparing circuit with a smoothed voltage of the voltage across the semiconductor switching element.

3. The DC motor control circuit of claim 1, further comprising a switch circuit for supplying the voltage across the semiconductor switching element to the first comparing circuit while the semiconductor switching element is off.

4. The DC motor control circuit of claim 1, further comprising a protection circuit for comparing the voltage across the semiconductor switching element and a reference voltage while the semiconductor switching element is on, and for forcing the second comparison circuit to turn off the semiconductor switching element and thereby stop the DC motor if the voltage across the semiconductor switching element is larger than the reference voltage.

5. A DC motor control circuit comprising:
   a DC motor;
   a semiconductor switching element connected to the DC motor, for controlling a current flowing through the DC motor;
   a voltage setting section for providing a setting voltage;
   a first comparing circuit for comparing a voltage across the semiconductor switching element and the setting voltage, and producing a comparison signal;
   a reference voltage Generating circuit for generating a reference voltage signal;
   a second comparing circuit for comparing the reference voltage signal and the comparison signal. and producing a drive signal for controlling switching of the semiconductor switching element; and
   a voltage correction circuit for correcting the setting voltage by a nonlinear characteristic.

6. A DC motor control circuit comprising:
   a DC motor;
   a semiconductor switching element connected to the DC motor, for controlling a current flowing through the DC motor;
   a voltage setting section for providing a setting voltage;
   a first comparing circuit for comparing a voltage across the semiconductor switching element and the setting voltage, and producing a comparison signal;
   a reference voltage generating circuit for generating a reference voltage signal;
   a second comparing circuit for comparing the reference voltage signal and the comparison signal, and producing a drive signal for controlling switching of the semiconductor switching element; and
   a voltage correction circuit for correcting the setting voltage by a nonlinear characteristic, wherein the voltage correction circuit includes a diode for providing the nonlinear characteristic.

7. A DC motor control circuit comprising:
   a DC motor;
   a semiconductor switching element connected to the DC motor, for controlling a current flowing through the DC motor;
   a driving circuit for producing a drive signal for controlling switching of the semiconductor switching element; and
   a protection circuit for comparing a voltage across the semiconductor switching element and a reference voltage while the semiconductor switching element is on, and for forcing the driving circuit to turn off the semiconductor switching element and thereby stop the DC motor if the voltage across the semiconductor switching element is larger than the reference voltage.

8. A DC motor control circuit comprising:
   a DC motor;
   an operation switch;
   voltage generating means comprising:
   first and second conductor regions between which a DC power supply voltage is applied;
   a resistor region located between the first and second conductor regions;
   first, second and third electrodes disposed adjacent to the first and second conductor regions and the resistor region, respectively;
   a movable contact for connecting the first conductor region and the first electrode, the resistor region and the third electrode, or the second conductor region and the second electrode;
   an output terminal connected to the first and second electrodes; and
   a resistor connected between the third electrode and the output terminal;
   voltage setting section for moving the movable contact in accordance with an operation amount of the operation switch for providing a setting voltage based on a voltage at the output terminal of the voltage generating means; and
   a control circuit for controlling a rotation speed of the motor based on the setting voltage.

9. The DC motor control circuit of claim 8, wherein the movable contact is a brush, and wherein each of gaps between the first to third electrodes is narrower than the brush, the gaps corresponding, in position, to boundaries between the first conductor region and the resistor region and between the second conductor region and the resistor region.

10. A DC motor control circuit comprising:
    a semiconductor switching element to be connected to a DC motor, for controlling a current flowing through the DC motor;

a voltage setting section for providing a setting voltage;

a first comparing circuit for comparing a voltage across the semiconductor switching element and the setting voltage, and producing a comparison signal;

a reference voltage generating circuit for generating a reference voltage signal; and a second comparing circuit for comparing the reference voltage signal and the comparison signal, and producing a drive signal for controlling switching of the semiconductor switching element.

11. The DC motor control circuit of claim 10, further comprising a smoothing circuit for supplying the first comparing circuit with a smoothed voltage of the voltage across the semiconductor switching element.

12. The DC motor control circuit of claim 10, further comprising a switch circuit for supplying the voltage across the semiconductor switching element to the first comparing circuit while the semiconductor switching element is off.

13. The DC motor control circuit of claim 10, further comprising a protection circuit for comparing the voltage across the semiconductor switching element and a reference voltage while the semiconductor switching element is on, and for forcing the second comparison circuit to turn off the semiconductor switching element and thereby stop the DC motor if the voltage across the semiconductor switching element is larger than the reference voltage.

14. A DC motor control circuit comprising:

a semiconductor switching element to be connected to a DC motor, for controlling a current flowing through the DC motor;

a voltage setting section for providing a setting voltage;

a first comparing circuit for comparing a voltage across the semiconductor switching element and the setting voltage, and producing a comparison signal;

a reference voltage generating circuit for generating a reference voltage signal;

a second comparing circuit for comparing the reference voltage signal and the comparison signal, and producing a drive signal for controlling switching of the semiconductor switching element; and a voltage correction circuit for correcting the setting voltage by a nonlinear characteristic.

15. A DC motor control circuit comprising:

a semiconductor switching element connected to a DC motor, for controlling a current flowing through the DC motor;

a voltage setting section for providing a setting voltage;

a first comparing circuit for comparing a voltage across the semiconductor switching element and the setting voltage, and producing a comparison signal;

a reference voltage generating circuit for generating a reference voltage signal;

a second comparing circuit for comparing the reference voltage signal and the comparison signal, and producing a drive signal for controlling switching of the semiconductor switching element; and a voltage correction circuit for correcting the setting voltage by a nonlinear characteristic, wherein the voltage correction circuit includes a diode for providing the nonlinear characteristic.

16. A DC motor control circuit comprising:

a semiconductor switching element to be connected to a DC motor, for controlling a current flowing through the DC motor;

a driving circuit for producing a drive signal for controlling switching of the semiconductor switching element; and a protection circuit for comparing a voltage across the semiconductor switching element and a reference voltage while the semiconductor switching element is on, and for forcing the driving circuit to turn off the semiconductor switching element and thereby stop the DC motor if the voltage across the semiconductor switching element is larger than the reference voltage.

17. A DC motor control circuit comprising:

an operation switch;

voltage generating means comprising:

first and second conductor regions between which a DC power supply voltage is applied;

a resistor region located between the first and second conductor regions;

first, second and third electrodes disposed adjacent to the first and second conductor regions and the resistor region, respectively;

a movable contact for connecting the first conductor region and the first electrode, the resistor region and the third electrode, or the second conductor region and the second electrode;

an output terminal connected to the first and second electrodes; and a resistor connected between the third electrode and the output terminal;

a voltage setting section for moving the movable contact in accordance with an operation amount of the operation switch for providing a setting voltage based on a voltage at the output terminal of the voltage generating means; and a control circuit for controlling a rotation speed of the motor based on the setting voltage.

18. The DC motor control circuit of claim 17, wherein the movable contact is a brush, and wherein each of gaps between the first to third electrodes is narrower than the brush, the gaps corresponding, in position, to boundaries between the first conductor region and the resistor region and between the second conductor region and the resistor region.

* * * * *